(12) United States Patent
Tian et al.

(10) Patent No.: US 12,107,788 B2
(45) Date of Patent: Oct. 1, 2024

(54) MULTIPLEXING SYNCHRONIZATION SIGNAL BLOCKS, CONTROL RESOURCE SET, AND SYSTEM INFORMATION BLOCKS

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Zhifei Fan, San Diego, CA (US); Iyab Issam Sakhnini, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/643,142

(22) Filed: Dec. 7, 2021

(65) Prior Publication Data

US 2022/0231811 A1    Jul. 21, 2022

Related U.S. Application Data

(60) Provisional application No. 63/199,679, filed on Jan. 15, 2021.

(51) Int. Cl.
*H04W 56/00*    (2009.01)
*H04L 5/00*    (2006.01)

(52) U.S. Cl.
CPC .......... *H04L 5/0048* (2013.01); *H04L 5/0094* (2013.01)

(58) Field of Classification Search
CPC  H04W 56/001; H04W 16/14; H04W 72/0446
See application file for complete search history.

(56) References Cited

U.S. PATENT DOCUMENTS

2019/0159226 A1    5/2019  Ly et al.
2023/0106166 A1*   4/2023  Oteri .................... H04L 5/0064
                                                           370/329

FOREIGN PATENT DOCUMENTS

EP    3751941 A1 * 12/2020  ........... H04B 7/0408

OTHER PUBLICATIONS

International Search Report and Written Opinion—PCT/US2021/062443—ISA/EPO—Apr. 14, 2022.

* cited by examiner

*Primary Examiner* — Marcus Smith
*Assistant Examiner* — Zhaohui Yang
(74) *Attorney, Agent, or Firm* — Haynes and Boone, LLP

(57) ABSTRACT

Wireless communications systems and methods related to multiplexing of synchronization blocks (SSBs), control resource sets (CORESETs), and system information blocks (SIBs) are provided. A user equipment (UE) receives, from a base station (BS), a first SSB of a first group of SSBs of an SSB burst set, wherein the first group of SSBs and a second group of SSBs of the SSB burst set are spaced apart in time by a group of CORESETs and SIBs. The group of CORESETs and SIBs comprises one CORESET and at least one SIB for each SSB of the first group of SSBs. The UE receives, in a first CORESET of the group of CORESETs and SIBs based on the first SSB, SIB scheduling information. The UE receives, based on the SIB scheduling information, a first SIB of the group of CORESETs and SIBs.

6 Claims, 19 Drawing Sheets

MULTIPLEXING SYNCHRONIZATION SIGNAL BLOCKS, CONTROL RESOURCE SET, AND SYSTEM INFORMATION BLOCKS

CROSS REFERENCE TO RELATED APPLICATION

The present application claims priority to and the benefit of U.S. Provisional Patent Application No. 63/199,679, filed Jan. 15, 2021, titled MULTIPLEXING SYNCHRONIZATION SIGNAL BLOCKS, CONTROL RESOURCE SET, AND SYSTEM INFORMATION BLOCKS, which is hereby incorporated by reference in its entirety as if fully set forth below and for all applicable purposes.

TECHNICAL FIELD

The present disclosure is directed to wireless communication systems and methods. Certain aspects can enable and provide techniques for multiplexing synchronization blocks (SSBs), control resource sets (CORESETs), and system information blocks (SIBs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may transmit various system information to facilitate initial network access by UEs. For instance, the BS may periodically transmit synchronization signal blocks (SSB) including various synchronization signals and system information associated with the network. The SSB may also provide information associated with a control resource set (CORESET) where the BS may transmit scheduling information for additional system information. Accordingly, the BS may transmit the scheduling information in the indicated CORESET and transmit the additional system information according to the scheduling information.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE), the method includes receiving, from a base station (BS), a first synchronization signal block (SSB) of a first group of SSBs of an SSB burst set, where the first group of SSBs and a second group of SSBs of the SSB burst set are spaced apart in time by a group of control resource sets (CORESETs) and system information blocks (SIBs), where the group of CORESETs and SIBs includes one CORESET and at least one SIB for each SSB of the first group of SSBs; receiving, in a first CORESET of the group of CORESETs and SIBs based on the first SSB, SIB scheduling information; and receiving, based on the SIB scheduling information, a first SIB of the group of CORESETs and SIBs.

In an additional aspect of the disclosure, a method of wireless communication performed by base station (BS), the method includes transmitting a first group of synchronization signal blocks (SSBs) and a second group of SSBs associated with an SSB burst set, where the first group of SSBs and the second group of SSBs are spaced apart in time by a group of control resource sets (CORESETs) and system information blocks (SIBs), where the group of CORESETs and SIBs includes one CORESET and at least one SIB for each SSB of the first group of SSBs; transmitting, in a first CORESET within the group of CORESETs and SIBs, SIB scheduling information; and transmitting, based on the SIB scheduling information, a first SIB of the group of CORESETs and SIBs.

In an additional aspect of the disclosure, a user equipment (UE) includes a processor; and a transceiver coupled to the processor, where the transceiver is configured to receive, from a base station (BS), a first synchronization signal block (SSB) of a first group of SSBs of an SSB burst set, where the first group of SSBs and a second group of SSBs of the SSB burst set are spaced apart in time by a group of control resource sets (CORESETs) and system information blocks (SIBs), where the group of CORESETs and SIBs includes one CORESET and at least one SIB for each SSB of the first group of SSBs; receive, in a first CORESET of the group of CORESETs and SIBs based on the first SSB, SIB scheduling information; and receive, based on the SIB scheduling information, a first SIB of the group of CORESETs and SIBs.

In an additional aspect of the disclosure, a base station (BS) includes a processor; and a transceiver coupled to the processor, where the transceiver is configured to transmit a first group of synchronization signal blocks (SSBs) and a second group of SSBs associated with an SSB burst set, where the first group of SSBs and the second group of SSBs are spaced apart in time by a group of control resource sets (CORESETs) and system information blocks (SIBs), where the group of CORESETs and SIBs includes one CORESET and at least one SIB for each SSB of the first group of SSBs; transmit, in a first CORESET within the group of CORESETs and SIBs, SIB scheduling information; and transmit, based on the SIB scheduling information, a first SIB of the group of CORESETs and SIBs.

In an additional aspect of the disclosure, a non-transitory computer-readable medium having program code recorded thereon, the program code includes code for causing a user equipment (UE) to receive, from a base station (BS), a first synchronization signal block (SSB) of a first group of SSBs of an SSB burst set, where the first group of SSBs and a second group of SSBs of the SSB burst set are spaced apart in time by a group of control resource sets (CORESETs) and system information blocks (SIBs), where the group of CORESETs and SIBs includes one CORESET and at least one SIB for each SSB of the first group of SSBs; code for causing the UE to receive, in a first CORESET of the group of CORESETs and SIBs based on the first SSB, SIB scheduling information; and code for causing the UE to receive, based on the SIB scheduling information, a first SIB of the group of CORESETs and SIBs.

In an additional aspect of the disclosure, a non-transitory computer-readable medium having program code recorded thereon, the program code includes code for causing a base station (BS) to transmit a first group of synchronization signal blocks (SSBs) and a second group of SSBs associated with an SSB burst set, where the first group of SSBs and the second group of SSBs are spaced apart in time by a group of control resource sets (CORESETs) and system information blocks (SIBs), where the group of CORESETs and SIBs includes one CORESET and at least one SIB for each SSB of the first group of SSBs; code for causing the BS to transmit, in a first CORESET within the group of CORESETs and SIBs, SIB scheduling information; and code for causing the BS to transmit, based on the SIB scheduling information, a first SIB of the group of CORESETs and SIBs.

In an additional aspect of the disclosure, a user equipment (UE) includes means for receiving, from a base station (BS), a first synchronization signal block (SSB) of a first group of SSBs of an SSB burst set, where the first group of SSBs and a second group of SSBs of the SSB burst set are spaced apart in time by a group of control resource sets (CORESETs) and system information blocks (SIBs), where the group of CORESETs and SIBs includes one CORESET and at least one SIB for each SSB of the first group of SSBs; means for receiving, in a first CORESET of the group of CORESETs and SIBs based on the first SSB, SIB scheduling information; and means for receiving, based on the SIB scheduling information, a first SIB of the group of CORESETs and SIBs.

In an additional aspect of the disclosure, a base station (BS) includes means for transmitting a first group of synchronization signal blocks (SSBs) and a second group of SSBs associated with an SSB burst set, where the first group of SSBs and the second group of SSBs are spaced apart in time by a group of control resource sets (CORESETs) and system information blocks (SIBs), where the group of CORESETs and SIBs includes one CORESET and at least one SIB for each SSB of the first group of SSBs; means for transmitting, in a first CORESET within the group of CORESETs and SIBs, SIB scheduling information; and means for transmitting, based on the SIB scheduling information, a first SIB of the group of CORESETs and SIBs.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
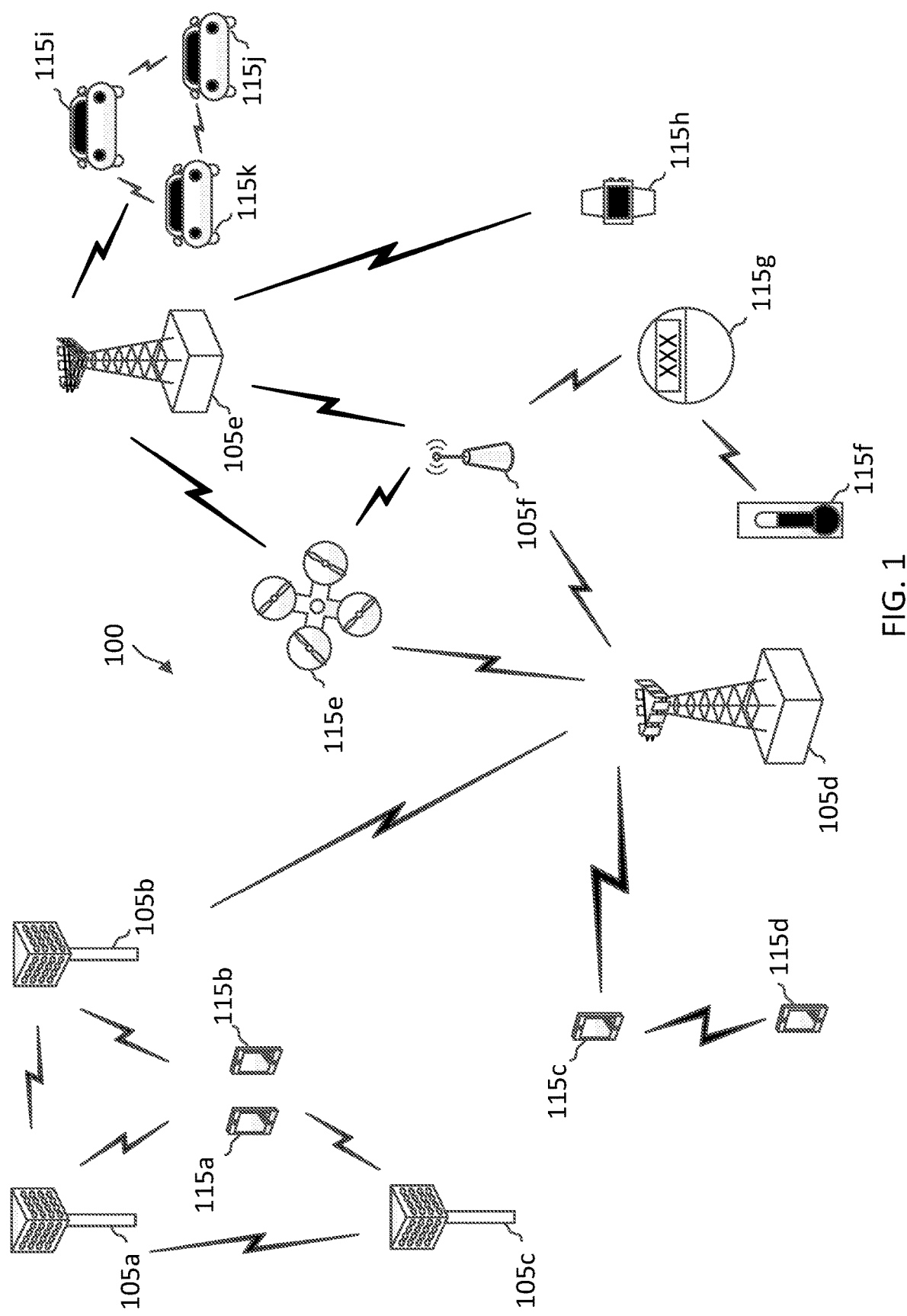
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As discussed above, NR or 5G may operate over high frequencies, such as mmWave frequency ranges or frequency, to take advantage of availability of wide-bandwidth channels to provision for a higher data throughput than the low frequency bands which are commonly used for conventional wireless communication systems. The mmWave frequency range between about 52.6 gigahertz (GHz) to about 71 GHz is referred to as frequency range 2 (FR2). However, FR2 can have a higher path-loss compared to lower frequency ranges, such as frequency range 1 (FR1) between about 4 GHz to about 7 GHz). To overcome the high path-loss in the FR2, the BS 105 and/or a UE 115 may apply beamforming techniques to form directional beams for transmissions and/or receptions. A directional beam may focus transmit signal energy and/or receive signal energy in a certain spatial direction and within a certain spatial angular sector or width. As used herein, the term "beam sweep" or "beam sweeping" may refer to a transmitter sequentially using each beam of a set of beams for transmissions or a receiver sequentially using each beam of a set of beams for receptions.

To facilitate initial network access over FR2 bands, the BS may transmit SSBs in multiple beam directions (using beam sweep) to cover a sector served by the BS. For instance, the BS may transmit a set of SSBs by sweeping through a set of predefined beam directions (using a set of transmission beams at the BS). The set of SSBs may be referred to as an SSB burst set. Each SSB may include a primary synchronization signal (PSS), a secondary synchronization signal (SSS), and/or a master information block (MIB). A MIB may include system information for initial network access and scheduling information for further system information, which may be referred to as remaining minimum system information (RMSI) or system information blocks (SIBs). For example, the MIB may include an indication of a control resource set (CORESET) where the BS may transmit scheduling information for RMSI. In some instances, a CORESET where SIB scheduling information is transmitted may be referred to as a CORESET 0.

When the BS transmits SSBs in multiple beam directions, the BS may configure a CORESET for each of the beam directions. In other words, a CORESET may be associated with a certain beam direction. The BS may transmit SIB scheduling information in each CORESET using a transmission beam directed to the beam direction associated with the CORESET. The SIB scheduling information may indicate a resource allocated for SIB transmission. The BS may transmit SIB(s) as scheduled by the scheduling information in the same beam direction as the SIB scheduling information. In this way, a UE desiring to access a network may monitor for SSBs in multiple beam directions (e.g., using beam sweeping). Upon detecting an SSB providing a received signal quality (e.g., a reference signal received power (RSRP)) that satisfies a certain threshold, the UE may continue to monitor for SIB scheduling information and/or SIB in the same beam direction as the SSB.

The present application describes mechanisms for multiplexing SSBs, CORESETs, and SIBs using time-division multiplexing (TDM). In certain aspects, a BS 105 may transmit SSBs of an SSB burst set in groups of SSBs spaced apart in time by gap periods, and may configure and/or schedule CORESETs (e.g., CORESET 0) and SIBs associated with the SSBs within the gap periods. In this regard, the BS 105 transmits a first group of SSBs of the SSB burst set in a first set of consecutive slots and transmits a second group of SSBs of the SSB burst set in a second set of consecutive slots. The first set of consecutive slots is spaced apart from the second set of consecutive slots by a gap. The BS 105 may configure or schedule a group of CORESETs and SIBs in the gap. The group of CORESETs and SIBs may include a set of CORESET/SIB (e.g., one CORESET and at least one SIB) for each SSB of the first group of SSBs. The BS may transmit SIB scheduling information in each CORESET of the group of CORESETs and SIBs for a corresponding SSB. Subsequently, the BS may transmit SIB(s) according to corresponding SIB scheduling information. As described above, the BS may transmit each SSB of an SSB burst set in a certain beam direction. As such, a CORESET associated with a certain SSB may be associated with the same beam direction as the certain SSB. The BS may transmit SIB scheduling information associated with a certain SSB and corresponding SIB(s) in the same beam direction as the certain SSB.

In some aspects, the BS 105 may transmit the SSBs in the SSB burst set in resources (e.g., slots) configured based on a first SCS, and schedule and/or configure the CORESETs and SIBs associated with the SSB burst set in resources configured based on a second SCS. In some aspects, the first SCS is different from the second SCS. In some aspects, each SSB may include an SSB index identifying the SSB. Accordingly, a UE may monitor for SSBs based on the first SCS. Upon receiving an SSB, the UE may identify a time location of a CORESET associated with the SSB based on the SSB index (e.g., indicated by the SSB), the first SCS, the second SCS, and/or a slot index associated with the SSB. The UE may monitor for SIB scheduling information in the identified CORESET based on the second SCS. Upon receiving SIB scheduling information, the UE may receive SIBs based on the scheduling information and the second SCS.

In certain aspects, the SSB burst set may include 64 SSBs. The BS may transmit the SSB burst set within a 5 millisecond (ms) time interval and may repeat the transmission of the SSB burst set according to a certain periodicity (e.g., about 10 ms, 20 ms, 40 ms, 80 ms or more). The BS may transmit the SSB burst set in four groups of 16 SSBs. The BS may transmit each group of SSBs in consecutive slots that are spaced apart from a neighboring or adjacent group of SSBs in time. In some instances, the first SCS associated with the SSB burst set is 120 kHz, and each group of 16 SSBs may be transmitted in 8 consecutive slots (defined based on a 120 kHz SCS), for example, with 2 SSBs per slot. The gaps between each of group of SSBs may include 2 slots at the 120 kHz SCS. If the second SCS associated with the CORESETs and SIBs is at 480 kHz, each gap may include 8 slots defined at the 480 kHz SCS and the BS may configure and/or schedule two sets of CORESET/SIB in each slot. If the second SCS associated with the CORESETs and SIBs is at 960 kHz, each gap may include 16 slots defined at the 960 kHz SCS and the BS may configure and/or schedule one set of CORESET/SIB in each slot. In other words, groups of SSBs are time-multiplexed with groups of CORESETs and SIBs.

In other aspects, the BS may configure or schedule a group of CORESETs and SIBs for a group of SSBs within the same set of consecutive slots where the group of SSBs. For instance, within each set of consecutive slots, the BS 105 may configure and/or schedule a group of CORESETs/SIBs for every sub-group of two SSBs in a gap period (symbols unoccupied by the SSBs) before the sub-group of two SSBs.

Aspects of the present disclosure can provide several benefits. For example, time-multiplexing groups of SSBs with groups of CORESETs and SIBs may allow a UE detecting an SSB with an acceptable received quality (e.g., about a certain threshold) to stop monitoring for further SSBs, compute a time location of an associated CORESET, and enter a low-power mode or a sleep-mode until a starting time of the CORESET. As such, the UE may save power during initial network access. While the present disclosure is discussed in the context of communicating over a mmWave band with SSBs configured for an SCS of 120 kHz and CORESETs and SIBs configured for an SCS of 480 kHz or an SCS of 960 kHz, the present disclosure can be applied for communications in any frequency ranges and with any suitable SCSs. Additionally, while the present disclosure is discussed in the context of an SSB burst set including 64

SSBs, the present disclosure may be applied to an SSB burst set including a smaller number of SSBs or a greater number of SSBs.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K)

orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB within a physical broadcast channel (PBCH). The PSS, SSS, and MIB may be transmitted in the form of synchronization signal block (SSBs) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a PBCH signal and may decode a MIB from the PBCH signal. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 decodes the DL data packet successfully, the UE 115 may transmit a HARQ acknowledgement (ACK) to the BS 105. Conversely, if the UE 115 fails to decode the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). ABS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
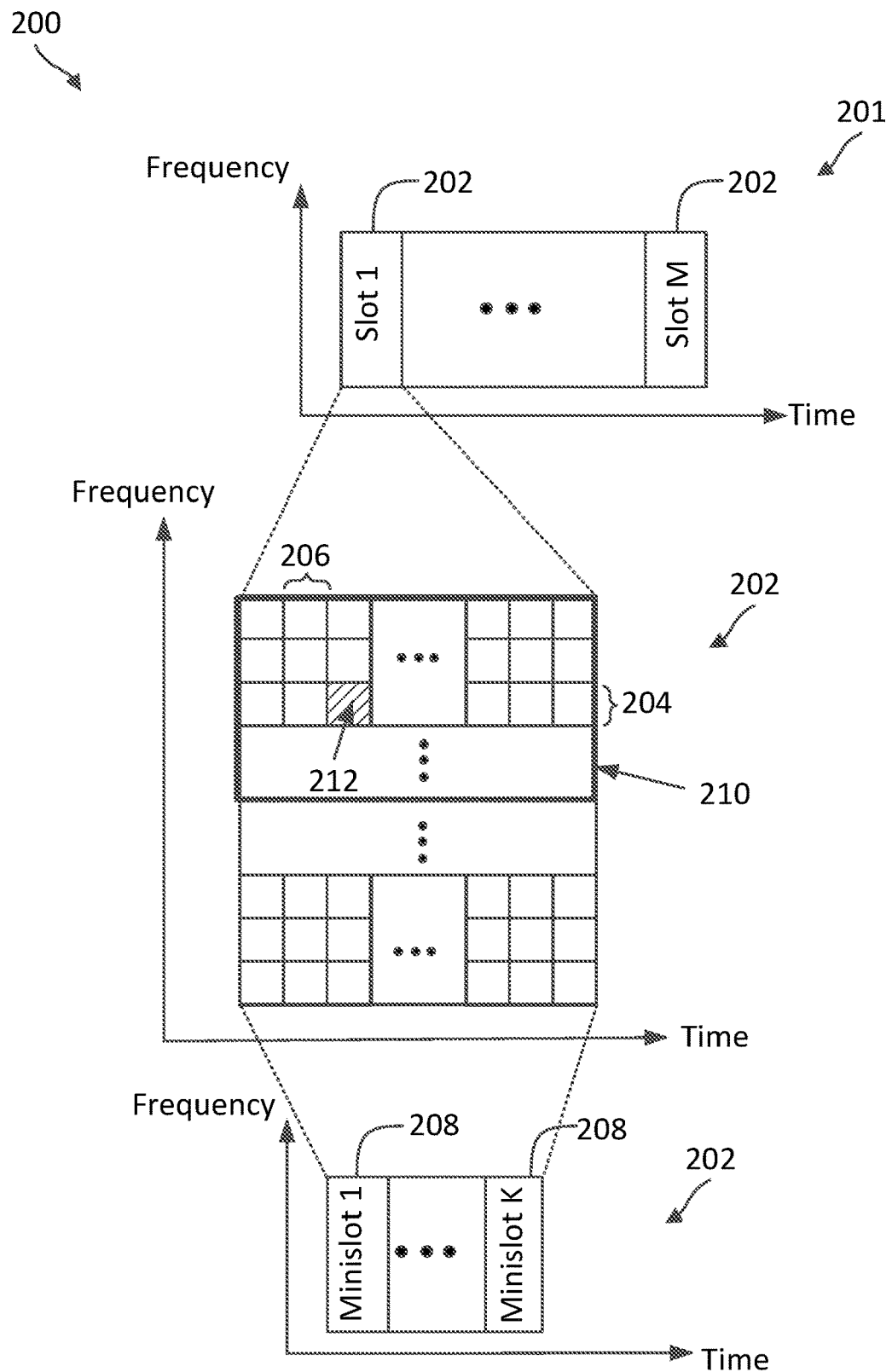
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , or 14 symbols).

Figure 3:
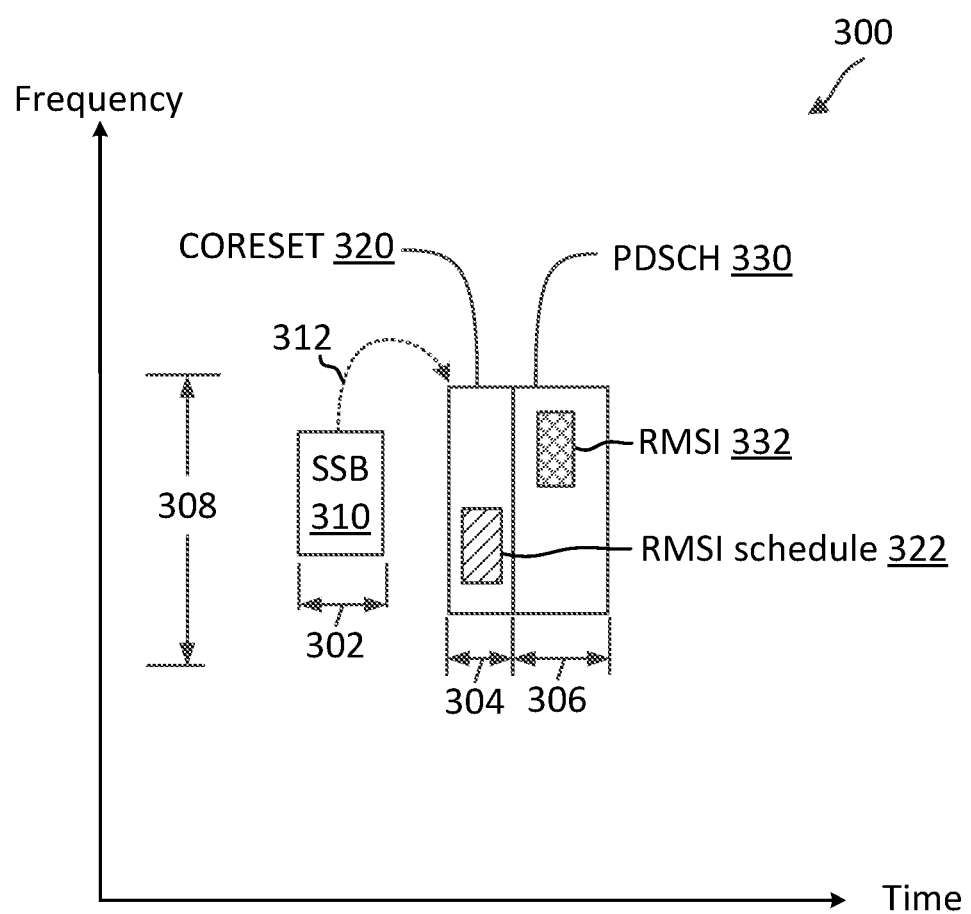
FIG. 3 illustrates a system information multiplexing scheme according to some aspects of the present disclosure.
Figure 4:
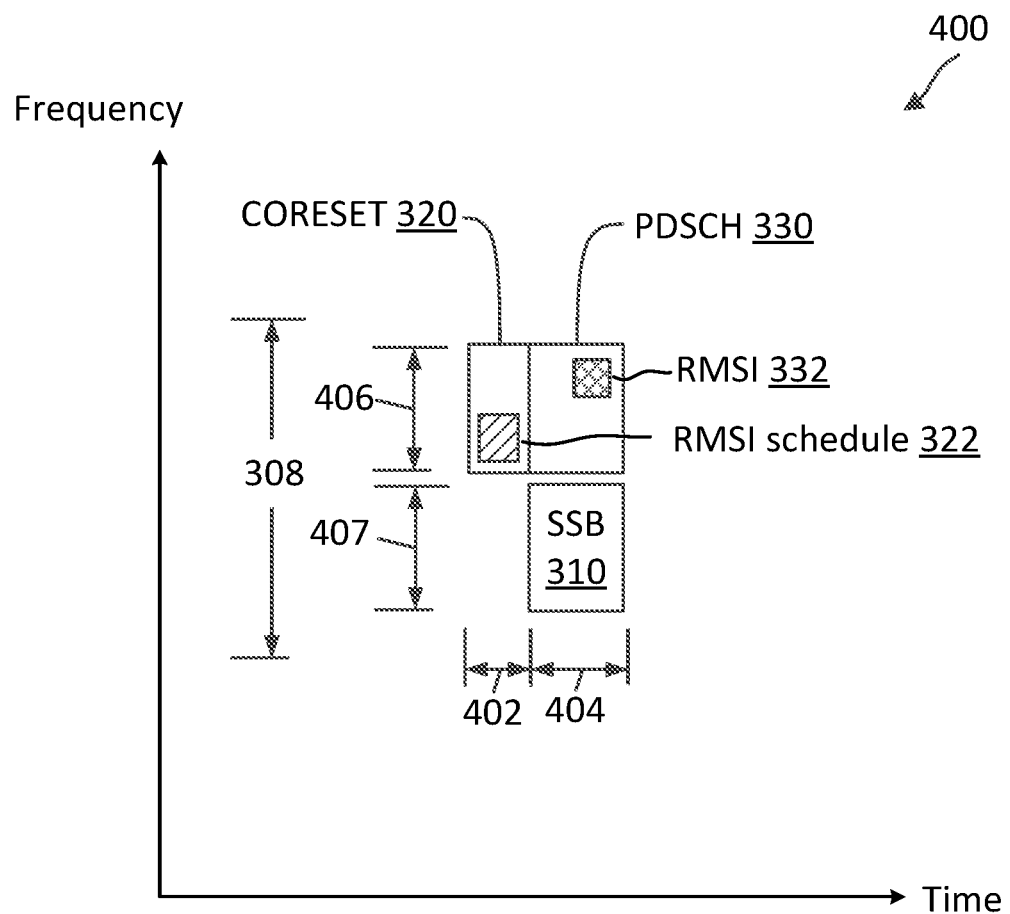
FIG. 4 illustrates a system information multiplexing scheme according to some aspects of the present disclosure.
Figure 5:
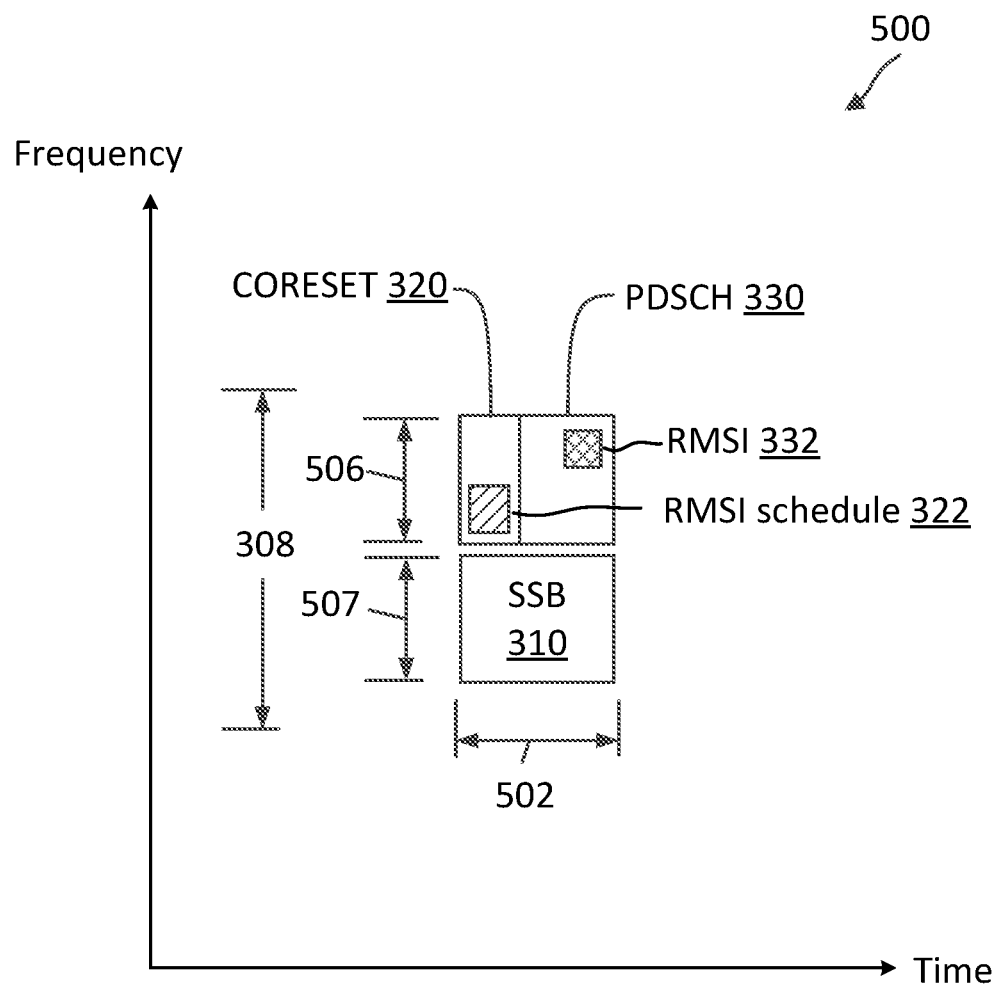
FIG. 5 illustrates a system information multiplexing scheme according to some aspects of the present disclosure.

As described above, a BS 105 may transmit SSBs to facilitate a UE 115 in performing an initial network access. Each SSB includes a PBCH carrying a MIB indicating information associated with a CORESET 0 where a PDCCH type 0 may be located. The BS may transmit RMSI scheduling information in the PDCCH type 0 (the CORESET 0). The scheduling information may indicate a resource in a PDSCH where the BS may transmit RMSI. FIGS. 3-5 illustrate various multiplexing patterns for multiplexing SSBs, CORESET 0, and PDSCH for RMSI. In FIGS. 3-5, the x-axes represent time, and the y-axes represent frequency.

FIG. 3 illustrates a system information multiplexing scheme 300 according to some aspects of the present disclosure. The scheme 300 may be employed by the network 100. In particular, a BS (e.g., the BSs 105) may employ the scheme 300 to transmit SSBs, RMSI scheduling information, and RMSI in the network as shown in the scheme 300. The scheme 300 may be used in conjunction with the radio frame structure 200 described above with respect to FIG. 2. For simplicity's sake, FIG. 3 may use the same reference numerals as in FIG. 2.

In the scheme 300, a BS 105 multiplexes an SSB 310, a CORESET 320 associated with RMSI scheduling, and a PDSCH 330 for RMSI transmission using time-division multiplexing (TDM). As shown in FIG. 3, the SSB 310, the CORESET 320, and the PDSCH 330 are located at different time periods 302, 304, and 306, respectively. In some aspects, the SSB 310, the CORESET 320 and the PDSCH 330 may located within may be located within the same slot 202. In some other aspects, the SSB 310 may be in one slot 202, and the CORESET 320 and the PDSCH 330 may be in another slot 202. In some aspects, the SSB 310, the CORE- SET 320 and the PDSCH 330 may located within an initial DL BWP 308. The initial DL BWP 308 is a default BWP used for a UE 115 during an initial access (before an RRC connection is established). The SSB 310 may include a PSS, an SSS, and a MIB. The SSB 310 may include a pointer, an indication, and/or a configuration (e.g., in a MIB) indicating the CORESET 320 as shown by the arrow 312. The CORESET 320 may be referred to as a CORESET 0 where a PDCCH type 0 may be located. The CORESET 320 may include time-frequency resources (e.g., including one or more subcarriers 204 in frequency and one or more symbols 206 in time or one or more resource blocks 210). The BS may transmit RMSI scheduling information 322 in the CORESET 320 (a PDCCH type 0). The RMSI scheduling information 322 may indicate time-frequency resources (e.g., including one or more subcarriers 204 in frequency and one or more symbols 206 in time or one or more resource blocks 210) where the BS 105 may transmit RMSI 332 and/or other transmission parameters related to the transmission of the RMSI 332. The RMSI 332 may include one or more SIBs (e.g., the SIB 1, SIB 2, etc.) providing various information (e.g., PRACH configurations) to facilitate communication with the network. In some instances, the RMSI scheduling information 322 may also be referred to as SIB scheduling information.

FIG. 4 illustrates a system information multiplexing scheme 400 according to some aspects of the present disclosure. The scheme 400 may be employed by the network 100. In particular, a BS (e.g., the BSs 105) may employ the scheme 400 to transmit SSBs, RMSI scheduling information, and RMSI in the network. The scheme 400 may be used in conjunction with the radio frame structure 200 described above with respect to FIG. 2. The scheme 400 is described using the same system information signaling structure as in the scheme 300 and may use the same reference numerals as in FIG. 3 for simplicity's sake.

In the scheme 400, a BS 105 multiplexes the SSB 310 with the RMSI CORESET 320 and the PDSCH 330 using frequency-division multiplexing (FDM). As shown in FIG. 4, the CORESET 320 is located in a frequency band 406 within the initial DL BWP 308 during a time period 402, the PDSCH 330 is located in the same frequency band 406 during a time period 404, and the SSB 310 is located in a frequency band 407 non-overlapping with the frequency band 406 during the same time period 404. In some aspects, the SSB 310, the CORESET 320 and the PDSCH 330 may located within may be located within the same slot 202. In some other aspects, the SSB 310 and the PDSCH 330 may be in one slot 202, and the CORESET 320 may be in another slot 202. Similar to the scheme 300, the SSB 310 may include a pointer, an indication, and/or a configuration indicating a location of the CORESET 320 where RMSI scheduling information 322 may be transmitted.

FIG. 5 illustrates a system information multiplexing scheme 500 according to some aspects of the present disclosure. The scheme 500 may be employed by the network 100. In particular, a BS (e.g., the BSs 105) may employ the scheme 500 to transmit SSBs, RMSI scheduling information, and RMSI in the network. The scheme 500 may be used in conjunction with the radio frame structure 200 described above with respect to FIG. 2. The scheme 500 is described using the same system information signaling structure as in the scheme 300 and may use the same reference numerals as in FIG. 3 for simplicity's sake.

In the scheme 500, a BS 105 may multiplex an SSB 310 (e.g., the SSBs 310) with the RMSI CORESET 320 and the PDSCH 330 using FDM. The CORESET 320 and the PDSCH 330 are located in a frequency band 506 within an initial active DL BWP 308 during a time period 502. The SSB 310 is located in a frequency band 507 non-overlapping with the frequency band 506 during the same time period 502. Similar to the schemes 300 and 400, the SSB 310 may include a pointer, an indication, and/or a configuration may indicate a location of the CORESET 320 where RMSI scheduling information 322 may be transmitted.

In some aspects, the schemes 300, 400, and 500 may be referred to as patterns 1, 2, and 3 respectively. The network 100 may utilize any one of the patterns 1, 2, or 3 for communications over a FR1 band or a FR2 band. In certain aspects, the network 100 may use the same numerology (e.g., the same SCS) for SSB transmissions, CORESET 0 configurations, and RMSI transmissions. In other aspects, the network 100 may use one numerology (e.g., a first SCS) for SSB transmissions and another numerology (e.g., a second, different SCS) for CORESET 0 configurations and RMSI transmissions. In some examples, in an FR1 band, the BS 105 may transmit SSBs using an SCS of 15 kHz or 30 kHz, and may configure CORESET 0 and transmit RMSI using an SCS of 15 kHz or 30 KHz. Thus, there are 4 combinations for configuration and/or transmission of SSB/CORESET/RMSI in FR1 band. In an FR2 band, the BS 105 may transmit SSBs using an SCS of 120 kHz or 240 kHz, and may configure CORESET 0 and transmit RMSI using an SCS of 60 kHz or 120 kHz. Thus, there are also 4 combinations for configuration and/or transmission of SSB/CORESET/RMSI in FR2 bands. In some aspects, the BS 105 may utilize pattern 1 (e.g., the scheme 300) for any of the 8 SSB/CORESET/RMSI combinations (e.g., 4 combination for FR1 and 4 combinations for FR2). The BS 105 may utilize pattern 2 (e.g., the scheme 400) for some of the SSB/CORESET/RMSI configurations in FR2, for example, for SSBs based on SCS 120 kHz and CORESET/RMSI based on 60 kHz SCS. The BS 105 may utilize pattern 3 for the configuration where SSB/CORESET/RMSI are all based on an SCS of 120 kHz.

In some aspects, the network 100 may operate over a high-frequency band, for example, in a frequency range 2 (FR2) band, and may use different numerologies (e.g., different SCSs) for SSB transmission, CORESET 0, and RMSI transmission. In some aspects, a BS 105 may utilize a first SCS (e.g., 120 kHz) for SSB transmission and a second, different SCS of (e.g., 480 kHz or 960 kHz) for CORESET 0 configuration and RMSI transmission. Further, due to the high path-loss in the FR2 band, the BS 105 and/or a UE 115 may apply beamforming techniques to form directional beams for transmissions and/or receptions. In this regard, a BS 105 and/or a UE 115 may be equipped with one or more antenna panels or antenna arrays with antenna elements that can be configured to focus transmit signal energy and/or receive signal energy in a certain spatial direction and within a certain spatial angular sector or width. A beam used for such wireless communications may be referred to as an active beam, a best beam, or a serving beam.

In some aspects, the BS 105 may transmit a set of SSBs (e.g., the SSBs 310) in a set of predefined beam directions. The set of SSBs may be referred to as an SSB burst set. For instance, the BS 105 may transmit the set of SSBs by sweeping through the set of predefined beam directions (using a set of transmission beams at the BS 105). At the same time, the UE may determine an optimal reception beam based on the SSB beams. For instance, the UE may sweep through a set of beam directions (using a set of reception beams at the UE 115) to monitor for SSB from the BS 105. Upon determining the optimal reception beam, the UE may initiate a random access procedure with the BS using the determined reception beam. Upon completing the random access procedure, the UE 115 and the BS 105 may establish a connection with each other.

In some aspects, the set of predefined beam directions may correspond to a set of spatial angular sectors covering a sector served by the BS 105. Accordingly, the BS 105 may transmit an SSB in each of the predefined beam directions to cover the serving sector. A UE 115 located within the serving sector and/or range of the BS 105 may monitor for SSBs and may receive one or more of the SSBs. While each SSB in an SSB burst set may include similar or identical system information related to the network 100, each SSB may include a different SSB index that uniquely identifies each SSB within the SSB burst set. As an example, the SSB burst set may include 64 SSBs each transmitted in a different beam direction within a serving sector of the BS 105. The SSBs may be sequentially indexed from 0 to 63. As such, the SSB index may also be associated with a beam direction in which the BS 105 transmitted the SSB. As described above, an SSB may include an indication of a CORESET 0 where RMSI scheduling information (e.g., RMSI scheduling information 322) may be transmitted. When beamforming is applied, the CORESET 0 may be associated with the same beam direction as a corresponding SSB. In other words, the BS 105 may transmit RMSI scheduling information 322 in the CORESET 0 indicated by the SSB using a beam directing to the same beam direction as the SSB. The BS 105 may also transmit RMSI (e.g., the RMSI 332) scheduled by the RMSI scheduling information in the same beam direction as the SSB. In other words, each SSB in the set of SSBs is associated with a CORESET 0 (e.g., the CORESET 320) and RMSI (e.g., the RMSI 332). In this way, when a UE 115 determines a beam direction with an SSB having a receive quality (e.g., RSRP) satisfying a threshold, the UE 115 may continue to monitor for RMSI scheduling information and RMSI in the same beam direction where the SSB is received.

According to aspects of the present disclosure, a BS 105 may transmit SSBs of an SSB burst set in groups of SSBs spaced apart from each other in time by gap periods, and may configure and/or schedule CORESETs 0 and SIBs associated with the SSBs within the gap periods. For instance, the BS 105 transmits a first group of SSBs of the SSB burst set in a first set of consecutive slots and transmits a second group of SSBs of the SSB burst set in a second set of consecutive slots as will be discussed more fully below with reference to FIG. 6. The first set of consecutive slots is spaced apart from the second set of consecutive slots by a gap. The BS 105 may configure or schedule a group of CORESETs and SIBs in the gap, where the group of CORESETs and SIBs includes one CORESET (e.g., CORESET 0) and at least one SIB for each SSB of the first group of SSBs as will be discussed more fully below with reference to FIGS. 7A-7B and 8A-8B. In some other instances, the BS 105 configure or schedule a group of CORESETs and SIBs for a group of SSBs within the same set of consecutive slots where the group of SSBs is transmitted as will discussed more fully below with reference to FIGS. 14A-14B and 15A-15B. In some aspects, the BS 105 may transmit the SSBs in the SSB burst set based on a first SCS, and schedule and/or configure the CORESETs and SIBs associated with the SSB burst set based on a second SCS. In some aspects, the first SCS is the same as the second SCS. In some other aspects, the first SCS is different from the second SCS. For example, the first SCS is 120 kHz and the second SCS is 480 kHz as will be discussed more fully below with reference to FIGS. 7A-7B and 14A-14B. In another example, the first SCS is 120 kHz and the second SCS is 960 kHz as will be discussed more fully below with reference to FIGS. 8A-8B and 15A-15B.

Figure 6:
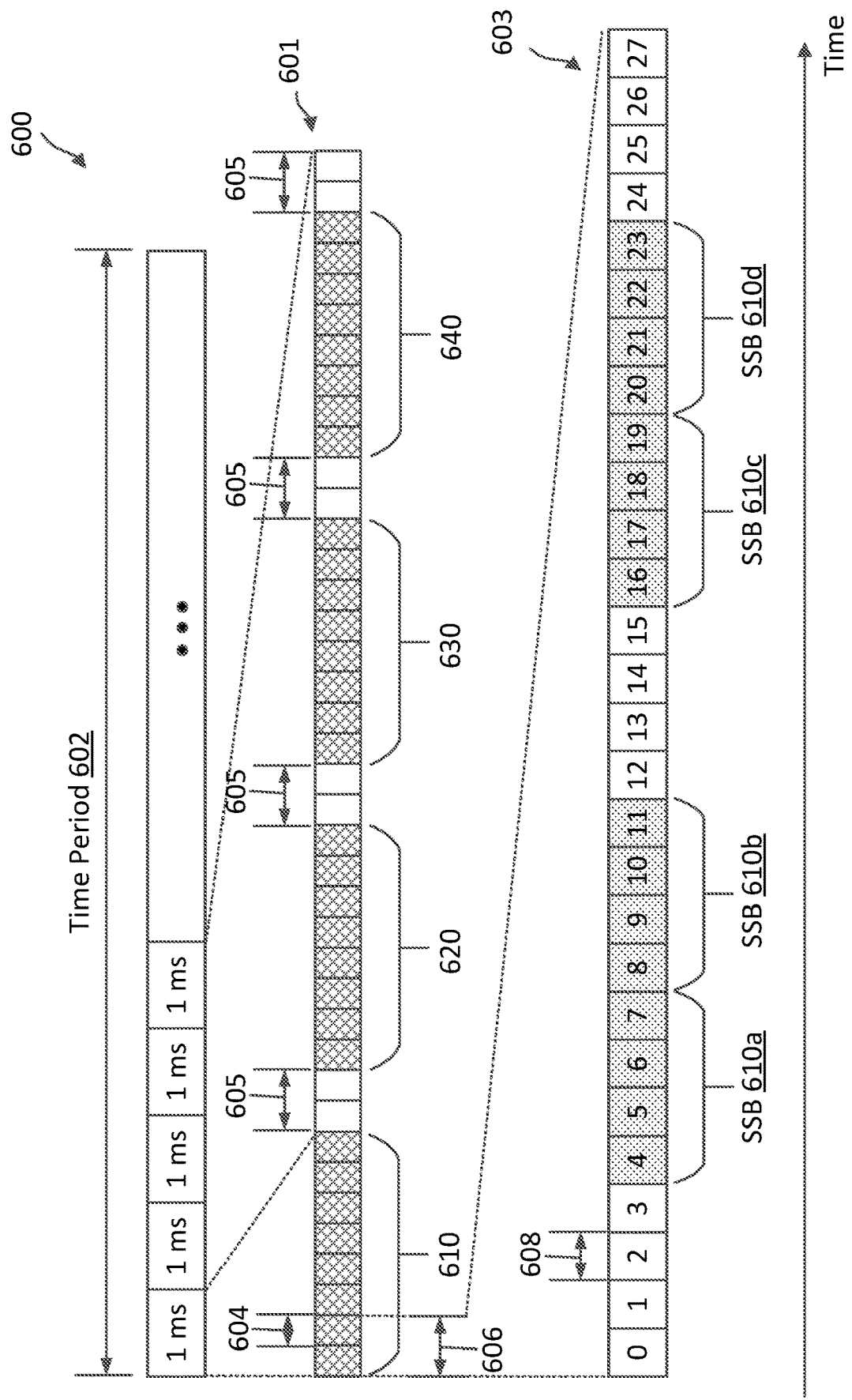
FIG. 6 illustrates a synchronization signal block (SSB) transmission scheme according to some aspects of the present disclosure.

FIG. 6 illustrates an SSB transmission scheme 600 according to some aspects of the present disclosure. The scheme 600 may be employed by BSs such as the BSs 105 and UEs such as the UEs 115 in a network such as the network 100 for communications. In particular, the BS 105 may transmit SSBs (e.g., the SSBs 310) of an SSB burst set based on a first SCS (e.g., 120 kHz) as shown in the scheme 600. In FIG. 6, the x-axis represents time in some arbitrary units.

In the scheme 600, the BS 105 may transmit a set of SSBs (an SSB burst set) periodically. In the example illustrated in FIG. 6, the BS 105 may transmit a set of SSBs (e.g., an SSB burst set) within a 5 ms window and may repeat the transmission of the set of SSBs at every time period 602. In some examples, the time period 602 may have a duration of about 20 ms. In other examples, the time period 602 may have a duration of about 40 ms, 80 ms, 160 ms or more. The time period 602 may include a plurality of slots 604 similar to the slots 202 of FIG. 2

For an SCS of 120 kHz, a slot 604 including 14 OFDM symbols may span a duration of about 0.125 ms. As such, there may be about eight slots 604 in each 1 ms time interval as shown by the expanded view 601. As an example, the set of SSBs may include 64 SSBs), and the BS 105 may partition the set of SSBs into about four groups of SSBs, each including 16 SSBs. The BS 105 may transmit each group of SSBs in eight consecutive slots 604 and may leave a time gap period 605 of about two slots 604 between neighboring or adjacent groups of SSBs. In the expanded view 601, the slots 604 that are shown as pattern-filled boxes may carry SSBs, and the slots 604 that are shown as empty boxes are the gap periods 605. As shown, the BS 105 transmits a first group of SSBs 610 in a first set of consecutive slots 604, a second group of SSBs 620 in a second set of consecutive slots 604, a third group of SSBs 630 in a third set of consecutive slots 604, and a fourth group of SSBs 640 in a fourth set of consecutive slots 604, where each group of SSBs 610 is spaced apart from a neighboring or adjacent group of SSBs by a gap period 605.

An expanded view 603 is shown for the first two slots 604 (e.g., in a duration 606 of 0.25 ms) in the time period 602. In the expanded view 603, symbols 608 in the first two slots 604 are indexed from 0 to 27. The BS 105 may transmit 4 SSBs of the first group of SSBs 610 (individually shown as 610a, 610b, 610c, and 610d) in the duration 606. The BS 105 may transmit each SSB 610a, 610b, 610c, 610d over four symbols 608. More specifically, the BS 105 may transmit the SSB 610a in the symbols 608 indexed 4-7, the SSB 610b in the symbols 608 indexed 8-11, the SSB 610c in the symbols 608 indexed 16-19, and the SSB 610d in the symbols 608 indexed 20-23.

Each SSB in the SSB set may include an SSB index that uniquely identifies the SSB within the SSB set. In some aspects, the SSBs may be arranged in a sequential order according to the SSB indices. For instance, the SSB 610a may include an SSB index 0, the SSB 610b may include an SSB index 1, the SSB 610c may include an SSB index 2, and the SSB 610d may include an SSB index 3. In some other aspects, the SSBs may be arranged in a different order. The BS 105 may transmit the remaining SSBs in the SSB set in a similar manner in the slots 604 shown by the pattern-filled boxes. The starting symbol locations for the SSBs in the SSB set may be expressed as shown below:

$$SSB \text{ starting symbol locations} = \{4, 8, 16, 20\} + 28 \times n, \quad (1)$$

where n={0, 1, 2, 3}, {5, 6, 7, 8}, {10, 11, 12, 13}, {15, 16, 17, 18}. As such, the BS 105 may complete the transmission of the 64 SSBs in the SSB set within the first 5 ms time of the time period 602.

Figure 7A:
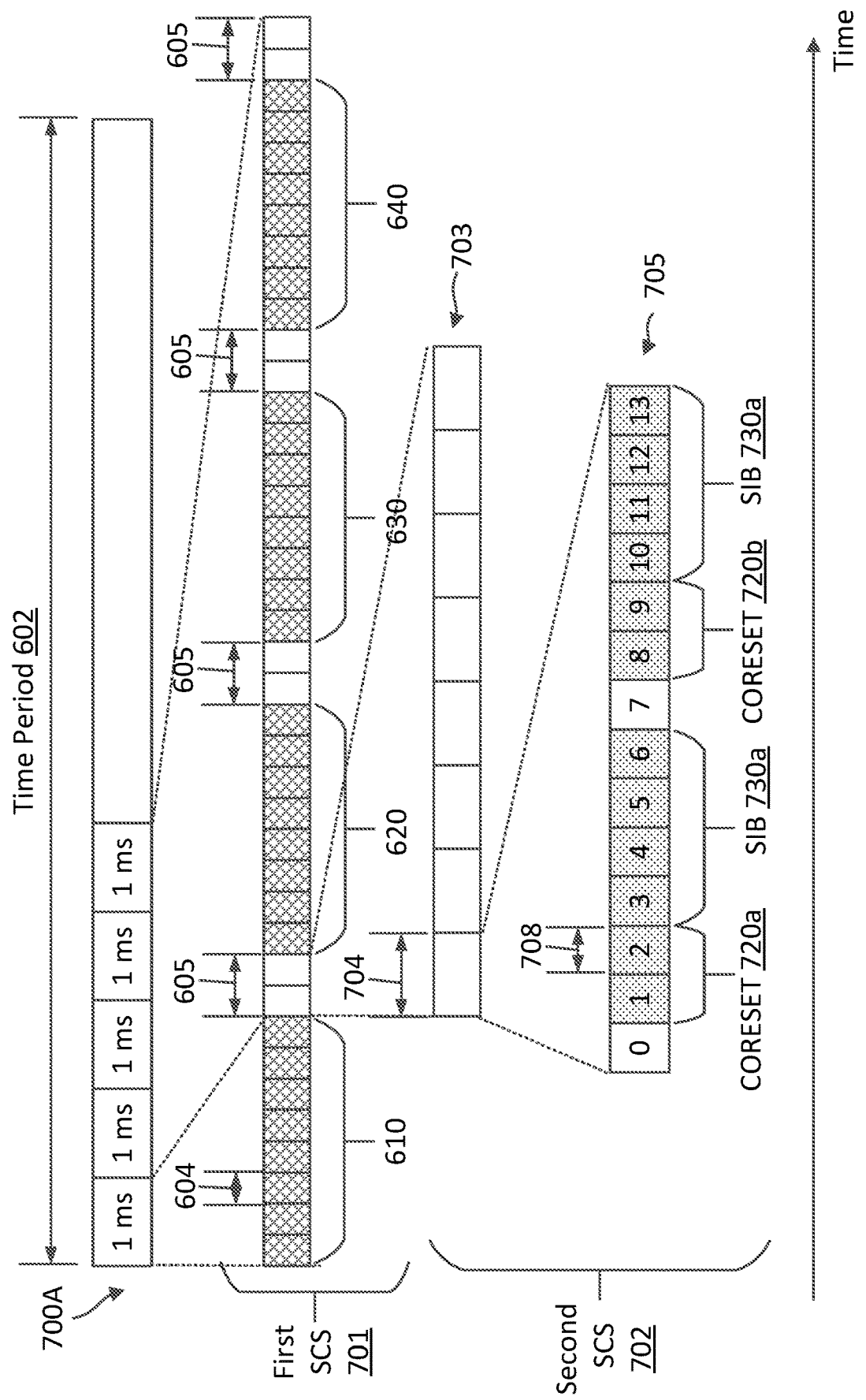
FIG. 7A illustrates a system information multiplexing scheme according to some aspects of the present disclosure.

FIG. 7A illustrates a system information multiplexing scheme 700A according to some aspects of the present disclosure. The scheme 700A may be employed by BSs such as the BSs 105 and UEs such as the UEs 115 in a network such as the network 100 for communications. In particular, the BS 105 may multiplex SSBs (e.g., the SSBs 310) transmitted based on a first SCS 701 (e.g., 120 kHz) with CORESET 0 (e.g., the CORESET 320) and SIBs (e.g., the RMSI 332) configured or scheduled based on a second SCS 702 (e.g., 480 kHz) as shown in the scheme 700A. In FIG. 7A, the x-axis represents time in some arbitrary units. The scheme 700A is described using the same SSB transmission structure as in the scheme 600 and may use the same reference numerals as in FIG. 6 for simplicity's sake.

As described above, the BS 105 may time-multiplex SSBs and associated CORESETs (CORESET 0) in units of SSB groups and CORESET/SIB groups. In the scheme 700A, the BS 105 may configure a group of CORESETs and SIBs associated with a group of SSBs in a gap period 605 after the group of SSBs. For instance, the BS 105 may transmit a group of SSBs 610 in consecutive slots and may configure and/or schedule CORESETs and SIBs associated with the group of SSBs 610 in the gap period 605 subsequent to the group of SSBs 610. Similarly, the BS 105 may transmit a group of SSBs 620 in consecutive slots and may configure CORESETs and SIBs associated with the group of SSBs 620 in the gap period 605 subsequent to the group of SSBs 620. The BS 105 may transmit a group of SSBs 630 in consecutive slots and may configure CORESETs and SIBs associated with the group of SSBs 630 in the gap period 605 subsequent to the group of SSBs 630. The BS 105 may transmit a group of SSBs 640 in consecutive slots and may configure CORESETs and SIBs associated with the group of SSBs 640 in the gap period 605 subsequent to the group of SSBs 640.

As shown by the expanded view 703, a gap period 605 including two slots 604 at the first SCS 701 of 120 kHz may include eight slots 704 (each with 14 symbols 708) at the second SCS 702 of 480 kHz. In other words, if the slots 704 are indexed beginning at index 0 (at the start of time period 602), the eight slots 704 in the gap period 605 may correspond to slots with slot indices 32 to 39 at the second SCS 702 of 480 kHz. The BS 105 may configure two CORESETs (CORESET 0) in each slot 704. With eight slots 704 in each gap period 605, the BS 105 may configure 16 CORESETs in each gap period 605. Each CORESET may correspond to one of the SSBs in a group of SSBs transmitted in preceding slots 604. More specifically, the BS 105 may configure the CORESETs in the same sequential order across the gap period 605 as the SSBs. For instance, the BS 105 may configure a first CORESET for an SSB with an SSB index 0, followed by a second CORESET for an SSB with an SSB index 1, followed by a third CORESET for an SSB with an SSB index 2, and so on in a timeline across the gap period 605.

In the expanded view 705, symbols 708 in the first slot 704 of the gap period 605 are indexed from 0 to 13. In the example illustrated in FIG. 7A, the BS 105 configures a CORESET 720a in symbols 708 indexed 1-2, a CORESET 702b in symbols 8-9. The CORESET 720a may be associated with the SSB 610a (with SSB index 0) of FIG. 6, and the CORESET 720b may be associated with the next SSB 610b (with SSB index 1) of FIG. 6.

As described above, the CORESET 0 may be used for carrying a PDCCH type 0 where RMSI scheduling information or SIB scheduling information (e.g., the RMSI scheduling information 322) may be transmitted. The BS 105 may configure a PDSCH (e.g., the PDSCH 330) for SIB transmission (e.g., the RMSI 332) in symbols 708 adjacent to and following a corresponding CORESET 720. In this regard, the BS 105 may transmit SIB scheduling information associated with the SSB 610a in the CORESET 720a, where the SIB scheduling information may schedule a SIB 730a in a PDSCH located at symbols 708 indexed 3-6 subsequent to the CORESET 720a. The SIB 730a may occupy one or more of the symbols 708 indexed 3-6. Similarly, the BS 105 may transmit SIB scheduling information associated with the SSB 610b in the CORESET 720b, where the SIB scheduling information may schedule a SIB 730b in a PDSCH located at symbols 708 indexed 10-13 subsequent to the CORESET 720b. The SIB 730b may occupy one or more of the symbols 708 indexed 10-13. Symbols 708 indexed 0 and 7 in each slot 704 within the gap period 605 are gap symbols with no CORESET or SIB configured. The BS 105 may configure CORESETs and transmit SIBs for each remaining SSB of the group of SSBs 610 within the gap period 605. Subsequently, the BS 105 may configure CORESETs and transmit SIBs for each remaining group of SSBs 620, 630, 640 in a gap period 605 after the respective group of SSBs 620, 630, 640 in a similar manner as shown by the expanded view 705.

As an example, the SSB burst set may include 64 SSBs, for example, referred to as SSB 0 to SSB 63. Each SSB is associated with one of a set of 64 beams. The SSBs and associated CORESETs and SIBs may be scheduled or configured across time in the following order: a first group of 16 SSBs (e.g., SSB 0 to SSB 15), a first group of 16 CORESETs and 16 SIBs associated with the first group of 16 SSB, a second group of 16 SSBs (e.g., SSB 16 to SSB 31), a group of 16 CORESETs and 16 SIBs associated with the second group of 16 SSBs, a third group of 16 SSBs (e.g., SSB 32 to SSB 47), a group of 16 CORESETs and 16 SIBs associated with the third group of 16 SSB, and a fourth group of 16 SSBs (e.g., SSB 48 to SSB 63), a group of 16 CORESETs and 16 SIBs associated with the fourth group of 16 SSBs.

In some aspects, the time location of an SSB and the time location of a corresponding CORESET may have a relationship as shown below:

$$SFN_c = SFN_{SSB}, n_c = 32 + \text{floor}((i \bmod 16)/2) + \text{floor}(n_i/40) \times 40, \quad (2)$$

and the starting symbols index for the CORESET are {0, 7, 0, 7} for i=4×k+{0, 1, 2, 3},
where $SFN_c$ represents the system frame number identifying a radio frame (e.g., the radio frame 201) where the CORESET is located, $SFN_{SSB}$ represents the system frame number identifying a radio frame (e.g., the radio frame 201) where the SSB is located, $n_c$ represents the slot index, based on the second SCS, identifying a slot (e.g., the slot 704) where the CORESET is located within the radio frame, $n_i$ represents the slot index, based on the second SCS, identifying a slot (e.g., the slot 604) where the SSB is located within the radio frame, and i represents the SSB index identifying the SSB, i mod 16 represents the reminder when i is divided by 16 and function floor(x) generates the largest integer that is equal to or smaller than x. In other words, the slot index for the slot 704 where the CORESET is located is dependent on the SSB index, the slot index for the slot where the SSB is located. The constant value 32 in equation (2) is related to the ratio (e.g., 4) between the first SCS 701 and the SCS 802, a quantity of SSBs (e.g., 16) in each group of SSBs 610, 620, 630, and 640, and a number of SSBs (e.g., 2) transmitted per slots 704.

In some aspects, the BS 105 may include an index in the SSB (e.g., in the MIB) pointing to a table with a single entry including the equation (2). In this way, the UE 115 may look up the table and compute the slot index for the CORESET using equation (2). In some implementations, the BS 105 may include a PDCCH-configSIB1 message structure in the SSB (e.g., in the MIB), where the PDCCH-configSIB1 message structure may include a table index field (e.g., an 8-bit field) providing one or more table lookup index for determining a CORESET configuration. Since, the scheme 700A utilizes equation (2) to compute the CORESET slot index, at least some of the bits in the table index field may be repurposed for other indications.

A UE 115 may monitor for SSBs, for example, during an initial network access. Upon receiving an SSB (with an SSB index i) having a received quality (e.g., RSRP) satisfying a certain threshold, the UE 115 may determine not to monitor for further SSBs. The UE 115 identify a CORESET based on the received SSB. In this regard, the BS 105 may obtain an SSB index from the received SSB and identify a slot index of a slot where the SSB is received. The UE 115 may compute a slot index for the CORESET using equation (2) discussed above. In some instances, the UE 115 may obtain the equation (2) by looking up a preconfigured table based on a table index included in the SSB.

Figure 7B:
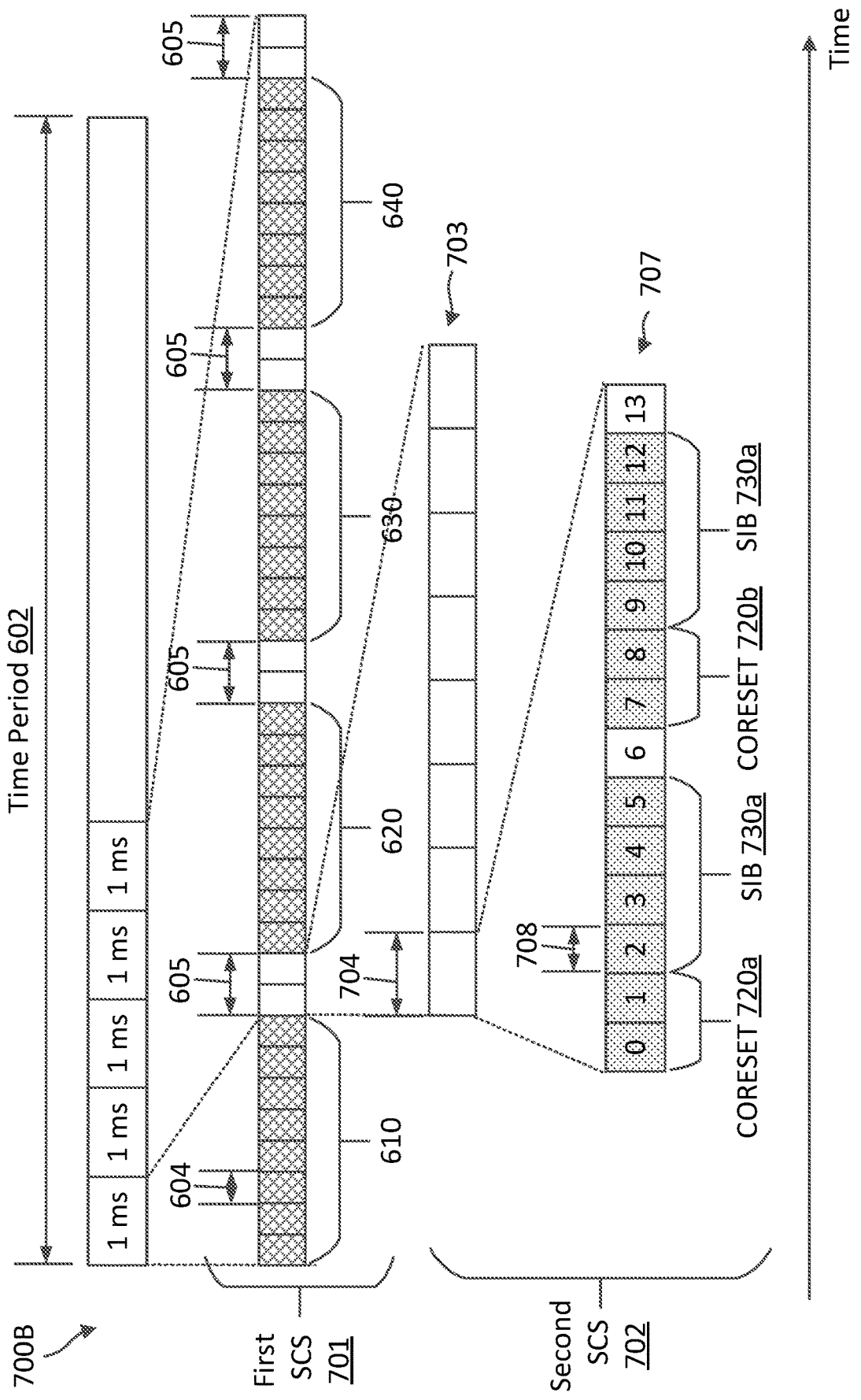
FIG. 7B illustrates a system information multiplexing scheme according to some aspects of the present disclosure.

FIG. 7B illustrates a system information multiplexing scheme 700B according to some aspects of the present disclosure. The scheme 700B may be employed by BSs such as the BSs 105 and UEs such as the UEs 115 in a network such as the network 100 for communications. In particular, the BS 105 may multiplex SSBs (e.g., the SSBs 310) transmitted based on a first SCS 701 (e.g., 120 kHz) with CORESET 0 (e.g., the CORESET 320) and SIBs (e.g., the RMSI 332) configured or scheduled based on a second SCS 702 (e.g., 480 kHz) as shown in the scheme 700B. In FIG. 7B, the x-axis represents time in some arbitrary units. The scheme 700B is substantially similar to the scheme 700A and may use the same reference numerals as in FIG. 7A for simplicity's sake. For instance, the BS 105 may configure a group of CORESETs and SIBs associated with a group of SSBs in a gap period 605 after the group of SSBs, and may determine a slot location for CORESETs and SIBs using the same equation (2) as discussed above. However, the BS 105 may configure the CORESETs and SIBs associated with the group of SSBs 620 within the gap periods 605 using different symbols compared to the scheme 700B.

As shown by the expanded view 707, the BS 105 configures a CORESET 720a in symbols 708 indexed 0-1, a CORESET 702b in symbols 7-8. The CORESET 720a may be associated with the SSB 610a (with SSB index 0) of FIG. 6, and the CORESET 720b may be associated with the next SSB 610b (with SSB index 1) of FIG. 6.

The BS 105 may further configure a PDSCH (e.g., the PDSCH 330) for SIB transmission (e.g., the RMSI 332) in symbols 708 adjacent to and following a corresponding CORESET 720. For instance, the BS 105 may transmit SIB scheduling information associated with the SSB 610a in the CORESET 720a, where the SIB scheduling information may schedule a SIB 730a in a PDSCH located at symbols 708 indexed 2-5 subsequent to the CORESET 720a. The SIB 730a may occupy one or more of the symbols 708 indexed 2-5. Similarly, the BS 105 may transmit SIB scheduling information associated with the SSB 610b in the CORESET 720b, where the SIB scheduling information may schedule a SIB 730b in a PDSCH located at symbols 708 indexed 9-12 subsequent to the CORESET 720b. The SIB 730b may occupy one or more of the symbols 708 indexed 9-12. Symbols 708 indexed 6 and 13 in each slot 704 within the gap period 605 are gap symbols with no CORESET or SIB configured. The BS 105 may configure CORESETs and transmit SIBs for each remaining SSB of the group of SSBs 610 within the gap period 605. Subsequently, the BS 105 may configure CORESETs and transmit SIBs for each remaining group of SSBs 620, 630, 640 in a gap period 605 after the respective group of SSBs 620, 630, 640 in a similar manner as shown by the expanded view 707.

As can be observed, the multiplexing configuration in schemes 700A and 700B may enable a UE 115 to efficiently determine a slot location of a CORESET 0 based on a detected SSB without performing a complex table look up. Further, the multiplexing configuration can provide opportunities for a UE 115 to save power. For instance, the UE 115 may compute a slot location (e.g., $n_c$) where a CORESET 0 associated with the SSB is located and operate in a sleep mode until a time closer to the start of the slot including the CORESET 0. In this regard, the UE 115 may configure at least some RF components or modules and/or some baseband components or modules to operate at a lower power mode (sleep state). The UE 115 may wake up from the sleep mode, for example, at a time before the slot including the CORESET 0, and monitor for SIB scheduling information in the CORESET 0.

Figure 8A:
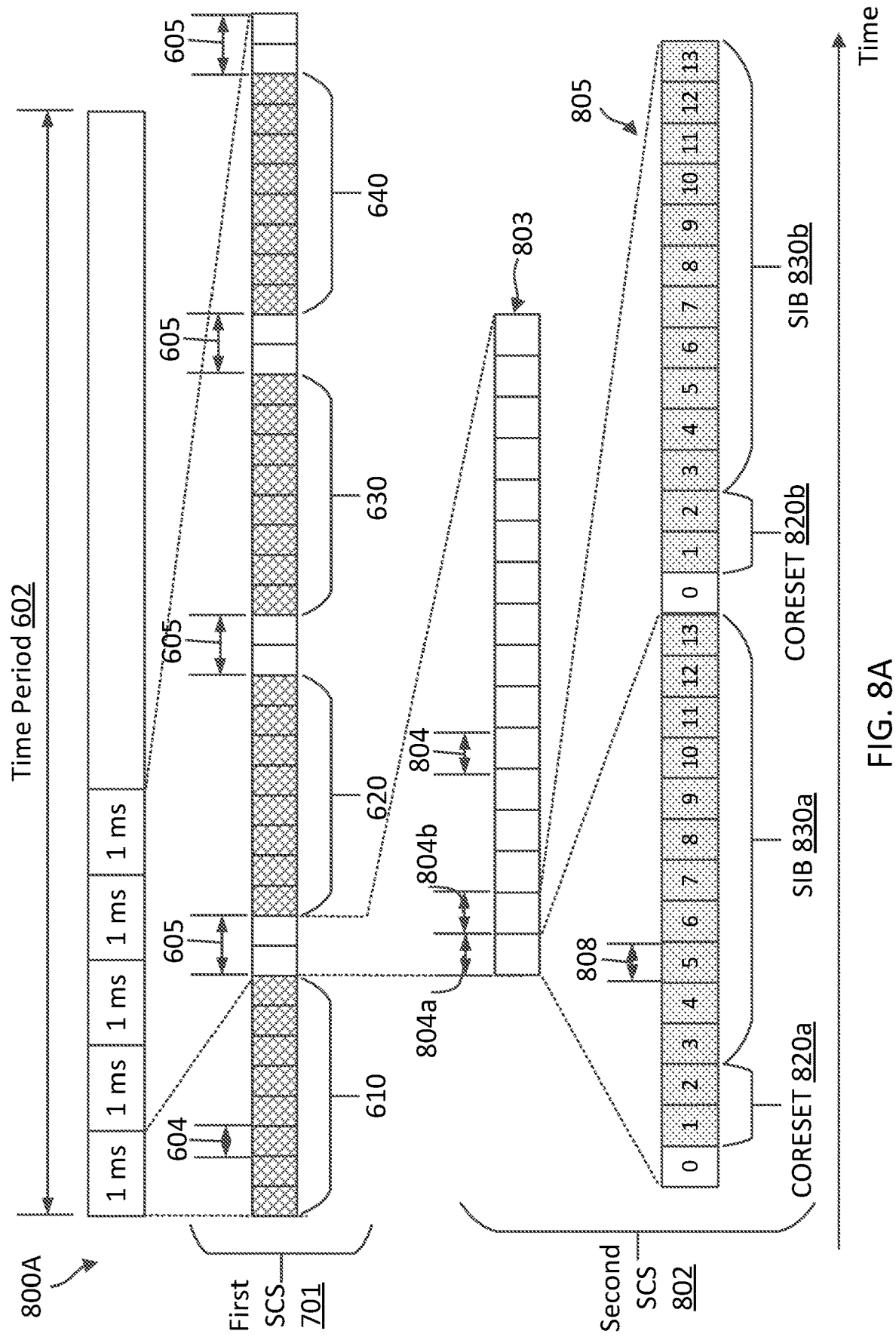
FIG. 8A illustrates a system information multiplexing scheme according to some aspects of the present disclosure.

FIG. 8A illustrates a system information multiplexing scheme 800A according to some aspects of the present disclosure. The scheme 800A may be employed by BSs such as the BSs 105 and UEs such as the UEs 115 in a network such as the network 100 for communications. In particular, the BS 105 may multiplex SSBs (e.g., the SSBs 310) transmitted based on a first SCS 701 (e.g., 120 kHz) with corresponding CORESET 0 (e.g., the CORESET 320) configured based on a second SCS 802 (e.g., 960 kHz) as shown in the scheme 800A. In FIG. 8A, the x-axis represents time in some arbitrary units. The scheme 800A is described using the same SSB transmission structure as in the scheme 600 and may use the same reference numerals as in FIG. 6 for simplicity's sake. The scheme 800A may use substantially similar mechanisms for scheduling CORESETs 0 and SIBs for corresponding SSBs, but the BS 105 may configure one CORESET in each slot 804 at the second SCS 802.

As shown by the expanded view 803, a gap period 605 including two slots 604 at the first SCS 701 of 120 kHz may include sixteen slots 804 (each with 14 symbols 808) at the second SCS 802 of 960 kHz. In other words, if the slots 804 are indexed beginning at index 0 (at the start of time period 602), the sixteen slots 804 may correspond to slots 64 to 79 at the second SCS 802 of 960 kHz. The BS 105 may configure one CORESETs (CORESET 0) in each slot 804. With sixteen slots 804 in each gap period 605, the BS 105 may configure 16 CORESETs in each gap period 605. Each CORESET may correspond to one of the SSBs in a group of SSBs transmitted in preceding slots 604. More specifically, the BS 105 may configure the CORESETs in the same sequential order across the gap period 605 as the SSBs. For instance, the BS 105 may configure a first CORESET for an SSB with an SSB index 0, followed by a second CORESET for an SSB with an SSB index 1, followed by a third CORESET for an SSB with an SSB index 2, and so on in a timeline across the gap period 605.

In the expanded view 805, symbols 808 in the first slot 804a of the gap period 605 are indexed from 0 to 13. Similarly, symbols 808 in the second slot 804b of the gap period 605 are indexed from 0 to 13. In the example illustrated in FIG. 8A, the BS 105 configures a CORESET 820a in symbols 808 indexed 1-2 of the first slot 804a and configures a CORESET 820b in symbols indexed 1-2 of the second slot 804b. The CORESET 820a may be associated with the SSB 610a (with SSB index 0) of FIG. 6, and the CORESET 820b may be associated with the next SSB 610b (with SSB index 1) of FIG. 6.

As described above, the CORESET 0 may be used for carrying a PDCCH type 0 where RMSI scheduling information or SIB scheduling information (e.g., the RMSI scheduling information 322) may be transmitted. The BS 105 may configure a PDSCH (e.g., the PDSCH 330) for SIB transmission (e.g., the RMSI 332) in symbols 808 adjacent to and following a corresponding CORESET 820. In this regard, the BS 105 may transmit SIB scheduling information associated with the SSB 610a in the CORESET 820a, where the SIB scheduling information may schedule a SIB 830a in a PDSCH located at symbols 808 indexed 3-13 subsequent to the CORESET 820a in the first slot 804a. The SIB 830a may occupy one or more of the symbols 808 indexed 3-13. Similarly, the BS 105 may transmit SIB scheduling information associated with the SSB 610b in the CORESET 820b, where the SIB scheduling information may schedule a SIB 830b in a PDSCH located at symbols 808 indexed 3-13 subsequent to the CORESET 820b in the second slot 804b. The SIB 830b may occupy one or more of the symbols 808 indexed 3-13 of the second slot 804b. Symbols 808 indexed 0 in each slot 804 within the gap period 605 is a gap symbol with no CORESET or SIB configured. The BS 105 may configure CORESETs and transmit SIBs for each remaining SSB of the group of SSBs 610 within the gap period 605. Subsequently, the BS 105 may configure CORESETs and transmit SIBs for each remaining group of SSBs 620, 630, 640 in a gap period 605 after the respective group of SSBs 620, 630, 640 in a similar manner as shown by the expanded view 805.

As an example, the SSB burst set may include 64 SSBs, for example, referred to as SSB 0 to SSB 63. Each SSB is associated with one of a set of 64 beams. The SSBs and associated CORESETs and SIBs may be scheduled or configured across time in the following order: a first group of 16 SSBs (e.g., SSB 0 to SSB 15), a first group of 16 CORESETs and 16 SIBs associated with the first group of 16 SSB, a second group of 16 SSBs (e.g., SSB 16 to SSB 31), a group of 16 CORESETs and 16 SIBs associated with the second group of 16 SSBs, a third group of 16 SSBs (e.g., SSB 32 to SSB 47), a group of 16 CORESETs and 16 SIBs associated with the third group of 16 SSB, and a fourth group of 16 SSBs (e.g., SSB 48 to SSB 63), a group of 16 CORESETs and 16 SIBs associated with the fourth group of 16 SSBs.

In some aspects, the time location of an SSB and the time location of a corresponding CORESET may have a relationship as shown below:

$$SFN_c = SFN_{SSB}, n_c = 64 + (i \bmod 16) + \text{floor}(n_i/80) \times 80, \quad (3)$$

and the starting symbols index for the CORESET are {0, 0, 0, 0} for i=4×k+{0, 1, 2, 3}, where $SFN_c$ represents the system frame number identifying a radio frame (e.g., the radio frame 201) where the CORESET is located, $SFN_{SSB}$ represents the system frame number identifying a radio frame (e.g., the radio frame 201) where the SSB is located, $n_c$ represents the slot index identifying a slot (e.g., the slot 704) where the CORESET is located within the radio frame, $n_i$ represents the slot index identifying a slot (e.g., the slot 604) where the SSB is located within the radio frame, and i represents the SSB index identifying the SSB, i mod 16 represents the reminder when i is divided by 16 and function floor(x) generates the largest integer that is equal to or smaller than x. In other words, the slot index for the slot 704 where the CORESET is located is dependent on the SSB index, the slot index for the slot where the SSB is located. The constant value 64 in equation (3) is related to the ratio (e.g., 8) between the first SCS 701 and the SCS 802, a quantity of SSBs (e.g., 16) in each group of SSBs 610, 620, 630, and 640, and a number of SSBs (e.g., 2) transmitted per slots 804.

In some aspects, the BS 105 may include an index in the SSB (e.g., in the MIB) pointing to a table with a single entry including the equation (3). In this way, the UE 115 may look up the table and compute the slot index for the CORESET using equation (3). In some implementations, the BS 105 may include a PDCCH-configSIB1 message structure in the SSB (e.g., in the MIB), where the PDCCH-configSIB1 message structure may include a table index field (e.g., an 8-bit field) providing one or more table lookup index for determining a CORESET configuration. Since, the scheme 800A utilizes equation (3) to compute the CORESET slot index, at least some of the bits in the table index field may be repurposed for other indications.

A UE 115 may monitor for SSBs, for example, during an initial network access. Upon receiving an SSB (with an SSB index i) having a received quality (e.g., RSRP) satisfying a certain threshold, the UE 115 may determine not to monitor for further SSBs. The UE 115 identify a CORESET based on the received SSB. In this regard, the BS 105 may obtain an SSB index from the received SSB and identify a slot index of a slot where the SSB is received. The UE 115 may compute a slot index for the CORESET using equation (3) discussed above. In some instances, the UE 115 may obtain the equation (3) by looking up a preconfigured table based on a table index included in the SSB.

Figure 8B:
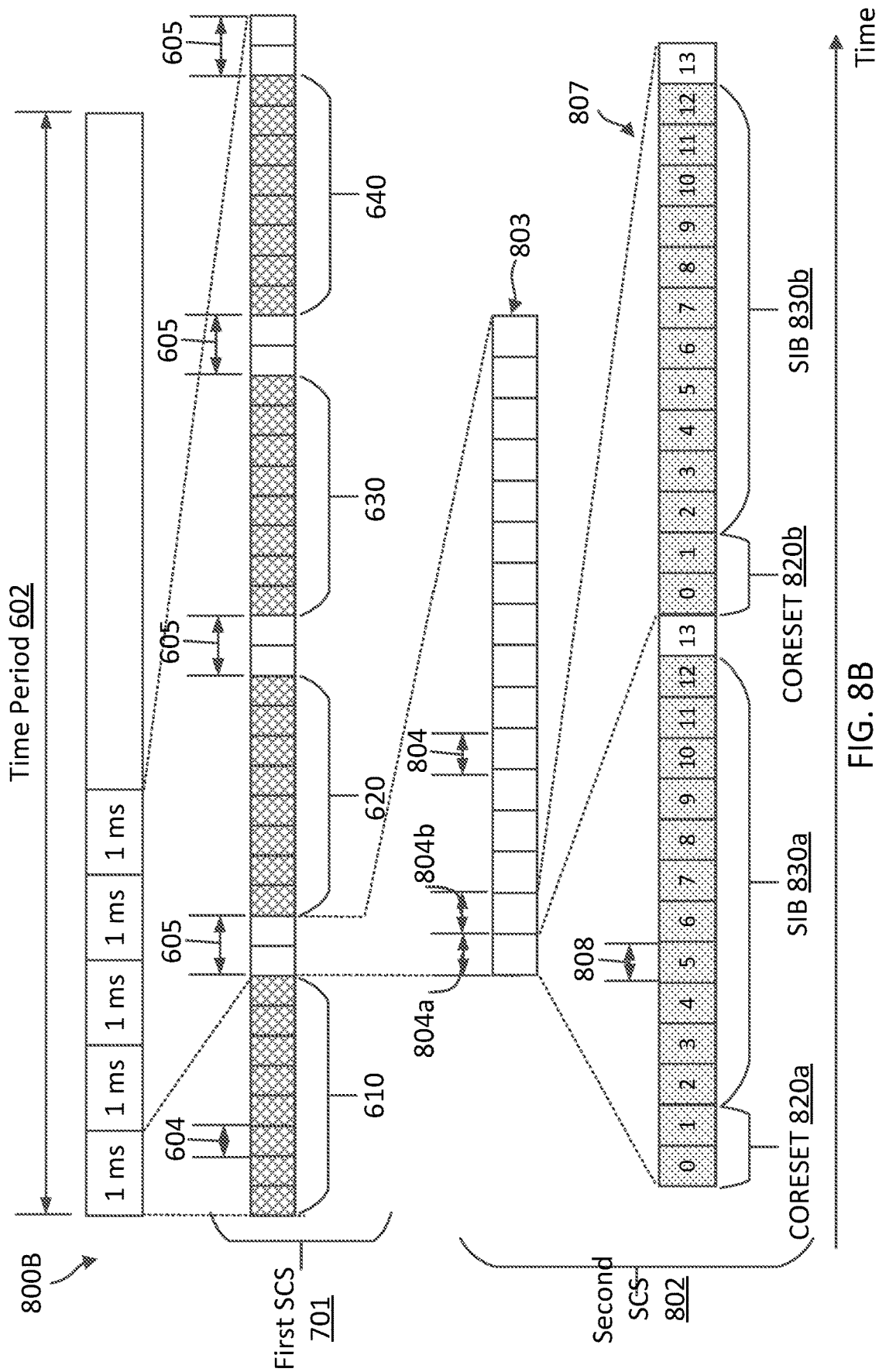
FIG. 8B illustrates a system information multiplexing scheme according to some aspects of the present disclosure.

FIG. 8B illustrates a system information multiplexing scheme 800B according to some aspects of the present disclosure. The scheme 800B may be employed by BSs such as the BSs 105 and UEs such as the UEs 115 in a network such as the network 100 for communications. In particular, the BS 105 may multiplex SSBs (e.g., the SSBs 310) transmitted based on a first SCS 701 (e.g., 120 kHz) with CORESET 0 (e.g., the CORESET 320) and SIBs (e.g., the RMSI 332) configured or scheduled based on a second SCS 702 (e.g., 960 kHz) as shown in the scheme 800B. In FIG. 8B, the x-axis represents time in some arbitrary units. The scheme 800B is substantially similar to the scheme 800A and may use the same reference numerals as in FIG. 8A for simplicity's sake. For instance, the BS 105 may configure a group of CORESETs and SIBs associated with a group of SSBs in a gap period 605 after the group of SSBs, and may determine a slot location for CORESETs and SIBs using the same equation (3) as discussed above. However, the BS 105 may configure the CORESETs and SIBs associated with the group of SSBs 620 within the gap periods 605 using different symbols compared to the scheme 800B.

As shown by the expanded view 807, the BS 105 configures a CORESET 820a in symbols 808 indexed 0-1 of the first slot 804a and configures a CORESET 820b in symbols indexed 0-1 of the second slot 804b. The CORESET 820a may be associated with the SSB 610a (with SSB index 0) of FIG. 6, and the CORESET 820b may be associated with the next SSB 610b (with SSB index 1) of FIG. 6.

The BS 105 may further configure a PDSCH (e.g., the PDSCH 330) for SIB transmission (e.g., the RMSI 332) in symbols 808 adjacent to and following a corresponding CORESET 820. For instance, the BS 105 may transmit SIB scheduling information associated with the SSB 610a in the CORESET 820a, where the SIB scheduling information may schedule a SIB 830a in a PDSCH located at symbols 808 indexed 2-12 subsequent to the CORESET 820a in the first slot 804a. The SIB 830a may occupy one or more of the symbols 808 indexed 2-12 of the slot 804a. Similarly, the BS 105 may transmit SIB scheduling information associated with the SSB 610b in the CORESET 820b, where the SIB scheduling information may schedule a SIB 830b in a PDSCH located at symbols 808 indexed 2-12 subsequent to the CORESET 820b in the second slot 804b. The SIB 830b may occupy one or more of the symbols 808 indexed 2-12 of the slot 804b. Symbols 808 indexed 13 in each slot 804 within the gap period 605 is a gap symbol with no CORESET or SIB configured. The BS 105 may configure CORESETs and transmit SIBs for each remaining SSB of the group of SSBs 610 within the gap period 605. Subsequently, the BS 105 may configure CORESETs and transmit SIBs for each remaining group of SSBs 620, 630, 640 in a gap period 605 after the respective group of SSBs 620, 630, 640 in a similar manner as shown by the expanded view 805.

In some aspects, similar to the schemes 700A-700B, the multiplexing configuration in schemes 800A-800B may also enable a UE 115 to efficiently determine a slot location of a CORESET 0 based on a detected SSB without performing a complex table look up. Further, the multiplexing configuration can provide opportunities for a UE 115 to save power as discussed above with reference to FIGS. 7A-7B.

In some aspects, the BS 105 may employ the scheme 700A, 700B, 800A, or 800B to define time locations (e.g., fixed time locations) for SSB/CORESET 0/RMSI scheduling and/or transmission using a set of predefined beam directions (e.g., using 64 different beams), but may not transmit SSBs using all 64 beams. In other words, some of the symbols (e.g., the symbols 608 of FIG. 6) or slots 604 configured for SSB transmission may be unoccupied. When employing the scheme 700A, 700B, 800A, or 800B with a fixed multiplexing configuration, the BS 105 may not schedule CORESET 0 and/or SIBs in those unoccupied slots.

Figure 9:
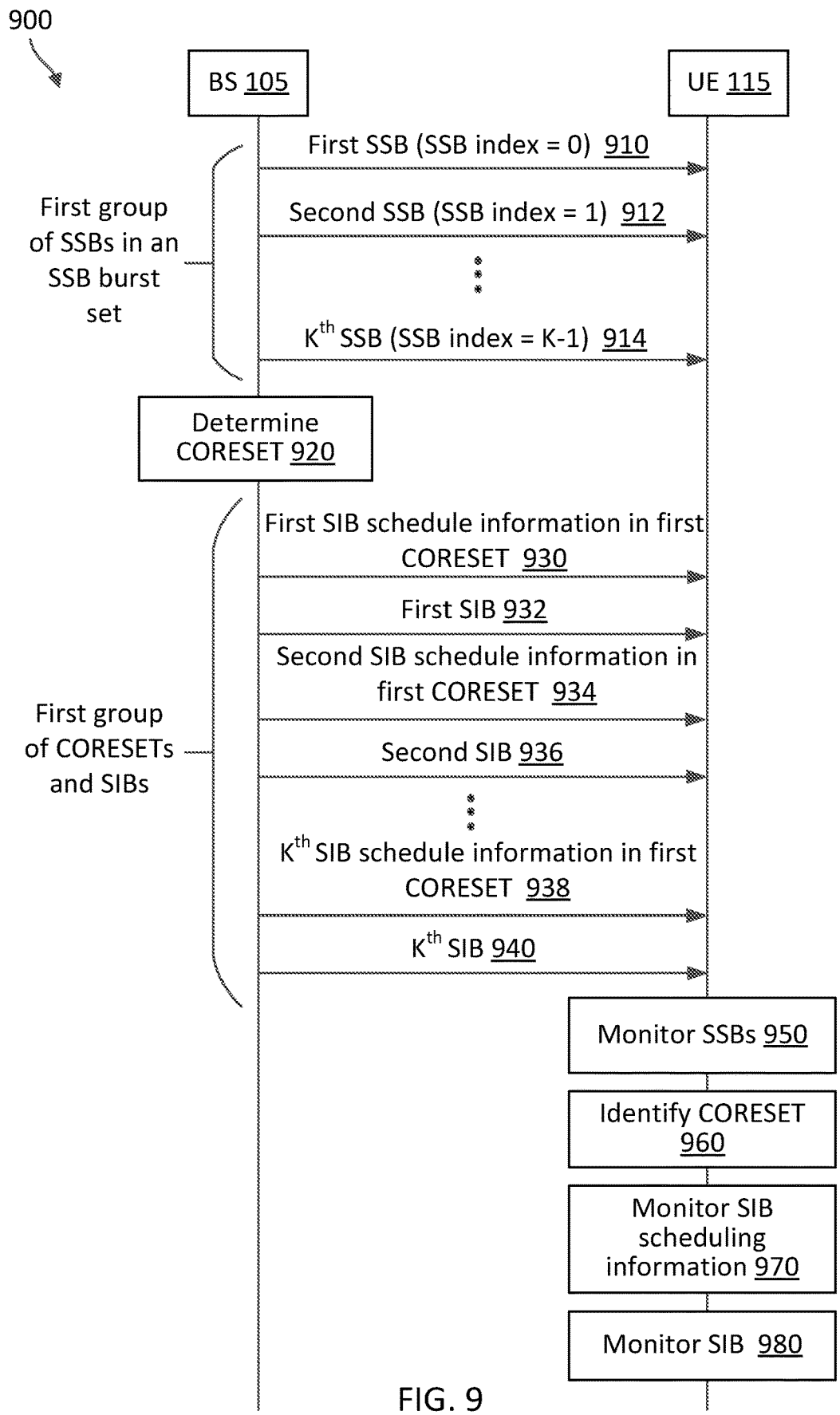
FIG. 9 is a sequence diagram illustrating a communication method for initial network access according to some aspects of the present disclosure.

FIG. 9 is a sequence diagram illustrating a communication method 900 for initial network access according to some aspects of the present disclosure. The method 900 may be performed by a wireless network, such as the network 100. In this regard, the method 900 is performed by a BS 105 and a UE 115. In some aspects, the BS 105 and the UE 115 may communicate with each other over a high-frequency band, such as a mmWave band, and may apply beamforming techniques to form directional beams for transmission and/or receptions. The method 900 may employ similar mechanisms as discussed above with reference to FIGS. 6-8. In some aspects, the BS 105 may utilize one or more components, such as the processor 1002, the memory 1004, the system information module 1008, the transceiver 1010, the modem 1012, and the one or more antennas 1016 shown in FIG. 10, to execute the actions of the method 900. The UE 115 may utilize one or more components, such as the processor 1102, the memory 1104, the system information module 1108, the transceiver 1110, the modem 1112, and the one or more antennas 1116 shown in FIG. 11, to execute the actions of the method 900. As illustrated, the method 900 includes a number of enumerated action, but aspects of the method 900 may include additional actions before, after, and in between the enumerated actions. In some aspects, one or more of the enumerated actions may be omitted or performed in a different order.

In the method 900, a BS 105 may transmit SSB in an SSB burst set in groups spaced apart from each other in time by gap periods, and may configure and/or schedule CORESETs 0 and SIBs associated with the SSBs during the gap periods. As shown, at action 910, the BS 105 transmits a first SSB (e.g., the SSB 610a) of a first group of SSBs (e.g., the group of SSBs 610) in the SSB burst set. The first SSB may be associated with an SSB index 0. For example, the first SSB may include an indication of an SSB index 0. The SSB burst set may be associated with a set of predefined beam directions, and the BS 105 may transmit the first SSB in a first beam direction of the set of predefined beam directions.

At action 912, the BS 105 transmits a second SSB (e.g., the SSB 610b) of the first group of SSBs. The second SSB may be associated with an SSB index 1. For example, the first SSB may include an indication of an SSB index 1. The BS 105 may transmit the second SSB in a next beam direction (e.g., a second beam direction) of the set of beam directions.

The BS 105 may transmit all SSBs in the first group of SSBs, for example, with each SSB in a different beam direction according the set of predefined beam directions. For instance, at action 914, the BS 105 may transmit a last SSB (e.g., $K^{th}$ SSB) of the first group of SSBs. The $K^{th}$ SSB may be associated with an SSB index K−1. For example, the first SSB may include an indication of an SSB index K−1. The BS 105 may transmit the $K^{th}$ SSB in a $K^{th}$ beam direction in the set of beam directions.

In some aspects, the BS 105 may transmit the first group of SSBs (at actions 910-914) in a first set of consecutive slots, where every four SSBs are transmitted in one of the first set of consecutive slots as discussed above with reference to FIG. 6. Accordingly, the BS 105 may determine a starting symbol location for each SSB in the first group of SSBs in accordance with the equation (1) described above. In some aspects, the first set of consecutive slots carrying the first group of SSBs may be spaced apart from a second set of consecutive slots configured for carrying a second group of SSBs of the SSB burst set. The first set of consecutive slots and the second set of consecutive slots may be spaced by a gap period (e.g., the gap period 605). The gap period may include resources configured and/or scheduled for a first group of CORESETs and SIBs that is associated with the first group of SSBs.

For instance, at action 920, the BS 105 determines CORESETs for the first group of SSBs. In this regard, the BS 105 may determine a CORESET (e.g., CORESET 0) for each SSB of the first group of SSBs. The BS 105 may compute a slot location of the CORESET based on a slot location of a respective SSB. In some aspects, the BS 105 may transmit the first group of SSBs based on a first SCS and may configure CORESETs 0 in resources (within the gap period) defined based on a second SCS. In some aspects, the first SCS is 120 kHz and the second SCS is 480 kHz as discussed above with reference to FIGS. 7A-7B. Accordingly, the BS 105 may determine a slot location for the CORESET in accordance with the equation (2) described above. In some other aspects, the first SCS is 120 kHz and the second SCS is 960 kHz as discussed above with reference to FIGS.

8A-8B. Accordingly, the BS 105 may determine a slot location for the CORESET in accordance with the equation (3) described above.

At action 930, after transmitting the first group of SSBs, the BS 105 transmits first SIB scheduling information (e.g., the RMSI scheduling information 322) in a first CORESET (e.g., the CORESET 720*a* or 820*a*) of the determined CORESETs. The first SIB scheduling information is associated with the first SSB and the BS 105 may transmit the first SIB scheduling information in the same first beam direction as the first SSB. The first SIB scheduling information may indicate resources in a PDSCH (e.g., the PDSCH 330).

At action 932, the BS 105 transmits a first SIB (e.g., the SIB 730*a* or 830*a*) according to the first SIB scheduling information. In this regard, the BS 105 may transmit the first SIB in the resources indicated by the first SIB scheduling information. The BS 105 may also utilize MCS and/or other transmission parameters indicated by the first SIB scheduling information to transmit the first SIB. In some aspects, the second SCS is 480 kHz, and the BS 105 may schedule and/or configure the first CORESET and the first SIB as discussed above with reference to FIG. 7A (e.g., as shown in the expanded view 705) or FIG. 7B (e.g., as shown in the expanded view 707). In some other aspects, the second SCS is 960 kHz, and the BS 105 may schedule and/or configure the first CORESET and the first SIB as discussed above with reference to FIG. 8A (e.g., as shown in the expanded view 805) or FIG. 8B (e.g., as shown in the expanded view 807). The first SIB is associated with the first SSB and the BS 105 may transmit the first SIB in the same first beam direction as the first SSB.

At action 934, the BS 105 transmits second SIB scheduling information (e.g., the RMSI scheduling information 322) in a second CORESET (e.g., the CORESET 720*b* or 820*b*) of the determined CORESETs. The second SIB scheduling information is associated with the second SSB and the BS 105 may transmit the second SIB scheduling information in the same second beam direction as the second SSB. The second SIB scheduling information may indicate resources in a PDSCH (e.g., the PDSCH 330).

At action 936, the BS 105 transmits a second SIB (e.g., the SIB 730*b* or 830*b*) according to the second SIB scheduling information. In this regard, the BS 105 may transmit the second SIB in the resources indicated by the second SIB scheduling information. The BS 105 may also utilize MCS and/or other transmission parameters indicated by the second SIB scheduling information to transmit the second SIB. In some aspects, the second SCS is 480 kHz, and the BS 105 may schedule and/or configure the second CORESET and second SIB as discussed above with reference to FIG. 7A (e.g., as shown in the expanded view 705) or FIG. 7B (e.g., as shown in the expanded view 707). In some other aspects, the second SCS is 960 kHz, and the BS 105 may schedule and/or configure the second CORESET and the second SIB as discussed above with reference to FIG. 8A (e.g., as shown in the expanded view 805) or FIG. 8B (e.g., as shown in the expanded view 807). The second SIB is associated with the second SSB and the BS 105 may transmit the second SIB in the same second beam direction as the second SSB.

The BS 105 may continue to transmit SIB scheduling information and SIBs for all SSBs in the first group of SSBs. For instance, at action 938, the BS 105 may transmit last SIB scheduling information (e.g., $K^{th}$ SIB scheduling information) of the first group of SSBs. The $K^{th}$ SIB scheduling information is associated with the $K^{th}$ SSB and the BS 105 may transmit the $K^{th}$ SIB scheduling information in the same $K^{th}$ beam direction as the $K^{th}$ SSB. The $K^{th}$ SIB scheduling information may indicate resources in a PDSCH (e.g., the PDSCH 330).

At action 940, the BS 105 transmits a $K^{th}$ SIB (e.g., the SIB 730*b* or 830*b*) according to the $K^{th}$ SIB scheduling information. In this regard, the BS 105 may transmit the $K^{th}$ SIB in the resources indicated by the $K^{th}$ SIB scheduling information. The BS 105 may also utilize MCS and/or other transmission parameters indicated by the $K^{th}$ SIB scheduling information to transmit the second SIB. In some aspects, the second SCS is 480 kHz, and the BS 105 may schedule and/or configure the $K^{th}$ CORESET and the $K^{th}$ SIB as discussed above with reference to FIG. 7A (e.g., as shown in the expanded view 705) or FIG. 7B (e.g., as shown in the expanded view 707). In some other aspects, the second SCS is 960 kHz, and the BS 105 may schedule and/or configure the $K^{th}$ CORESET and the $K^{th}$ SIB as discussed above with reference to FIG. 8A (e.g., as shown in the expanded view 805) or FIG. 8B (e.g., as shown in the expanded view 807). The $K^{th}$ SIB is associated with the $K^{th}$ SSB and the BS 105 may transmit the $K^{th}$ SIB in the same $K^{th}$ beam direction as the $K^{th}$ SSB.

At action 950, the UE 115 may monitor for SSBs from the BS 105, for example, based on the first SCS. In some instances, the UE 115 may sweep through one or more beam directions in a set of predefined beam directions to monitor for the SSBs. The UE 115 may determine a received signal measurement (e.g., RSRP) for each detected SSB and may determine whether the received signal measurement satisfies a predetermined threshold. The UE 115 may determine an optimal beam direction for communicating with the BS 105. As an example, the UE 115 may determine that the second SSB in the second beam direction (transmitted by the BS 105 at action 912) provides a best received quality (e.g., highest RSRP) among detected SSBs or at least provides a received quality satisfying a certain threshold.

At action 960, the UE 115 identifies a CORESET based on the second SSB. In some aspects, the second SCS is 480 kHz, and the second the UE 115 may determine a slot location for the CORESET in accordance with the equation (2) discussed above with reference to FIGS. 7A-7B. In some aspects, the second SCS is 960 kHz, and the second the UE 115 may determine a slot location for the CORESET in accordance with the equation (3) discussed above with reference to FIGS. 8A-8B. The CORESET may correspond to the second CORESET.

At action 970, the UE 115 monitors for SIB scheduling information in second CORESET based on the second SCS. The UE 115 may receive the second SIB scheduling information (transmitted by the BS 105 at action 934).

At action 980, upon receiving the second SIB scheduling information, the UE 115 receives the second SIB according to the second SIB scheduling information.

Subsequently, the BS 105 may transmit the second group of SSBs using similar operations as at actions 910 to 914, followed by SIB scheduling information and SIBs associated with the second group of SSBs using similar operations as at actions 930 to 940. The BS 105 may continue until all groups of SSBs (of the SSB burst set) and associated SIB scheduling information SIBs are transmitted. The BS 105 may repeat the transmission of the SSB burst set and associated SIB scheduling information SIBs according to a certain periodicity (e.g., about 20 ms, 40 ms, 80 ms, or 160 ms). In some other aspects, the BS 105 may not transmit all SSBs in the SSB burst set, but may still schedule and/or configure associated CORESETs and SIBs in the same symbols within the same gap periods as when all SSBs are transmitted.

Figure 10:
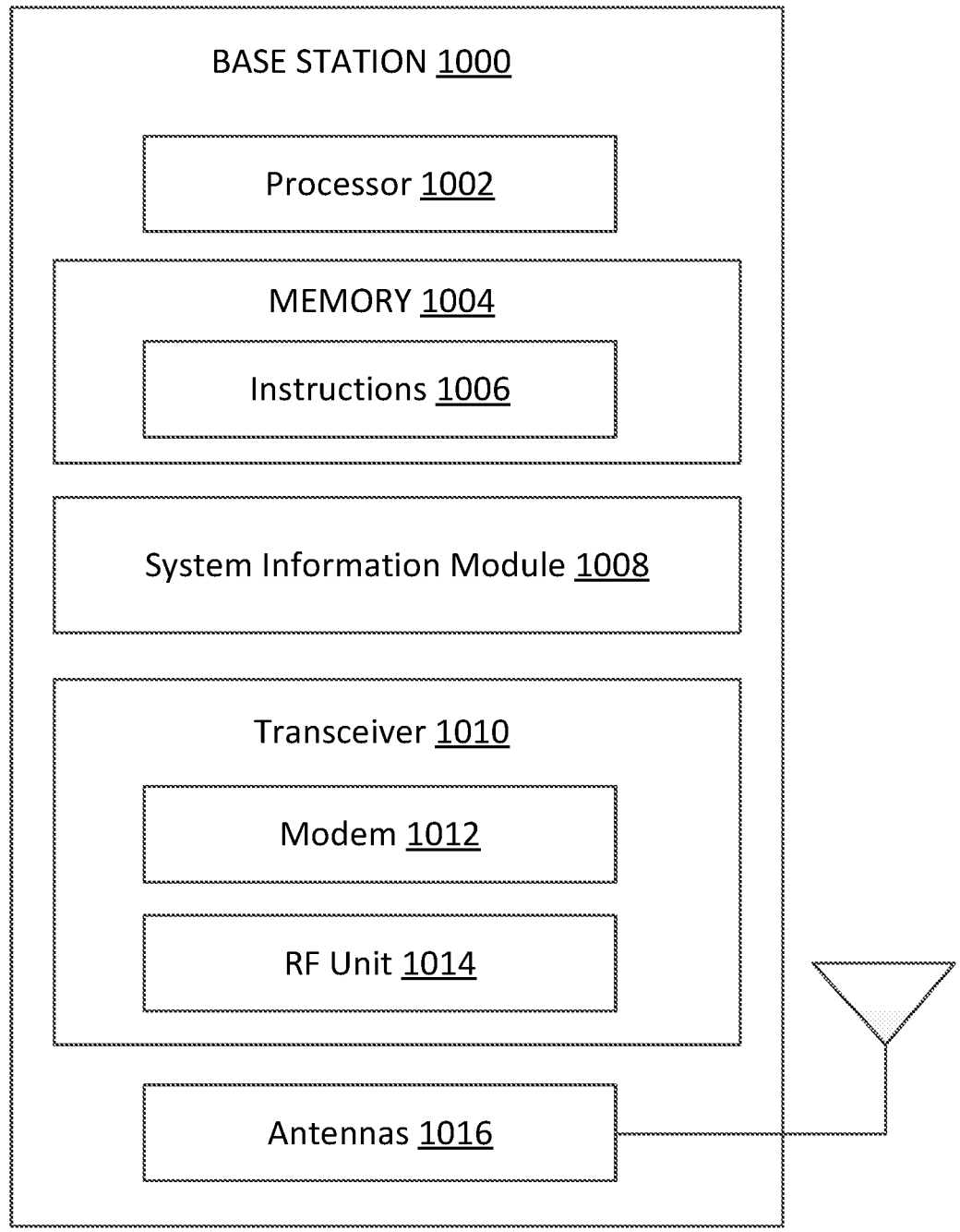
FIG. 10 is a block diagram of an exemplary base station (BS) according to some aspects of the present disclosure.

FIG. 10 is a block diagram of an exemplary BS 1000 according to some aspects of the present disclosure. The BS 1000 may be a BS 105 in the network 100 as discussed above in FIG. 1. A shown, the BS 1000 may include a processor 1002, a memory 1004, a system information module 1008, a transceiver 1010 including a modem subsystem 1012 and a RF unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 1-2 and 6-9, and 13. Instructions 1006 may also be referred to as program code. The program code may be for causing a wireless communication device to perform these operations, for example by causing one or more processors (such as processor 1002) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The system information module 1008 may be implemented via hardware, software, or combinations thereof. For example, the system information module 1008 may be implemented as a processor, circuit, and/or instructions 1006 stored in the memory 1004 and executed by the processor 1002. In some examples, the system information module 1008 can be integrated within the modem subsystem 1012. For example, the system information module 1008 can be implemented by a combination of software components (e.g., executed by a DSP or a general processor) and hardware components (e.g., logic gates and circuitry) within the modem subsystem 1012.

The system information module 1008 may communicate with various components of the BS 1000 to perform various aspects of the present disclosure, for example, aspects of FIGS. FIGS. 1-2 and 6-9, and 13. The system information module 1008 is configured to transmit a first group of SSBs and a second group of SSBs of an SSB burst set. In some instances, the SSB burst set may be associated with a set of predefined beam directions. The first group of SSBs and the second group of SSBs are spaced apart in time by resources associated with a group of CORESETs and SIBs. The group of CORESETs and SIBs includes one CORESET and at least one SIB for each SSB of the first group of SSBs.

In some aspects, the group of CORESETs and SIBs are associated with the first group of SSBs and are located in a gap period after the first group of SSBs (e.g., as shown in FIGS. 7A-7B and 8A-8B). In other aspects, the group of CORESETs and SIBs are associated with the first group of SSBs and are located in a gap period before the first group of SSBs (e.g., as shown in FIGS. 14A-14B and 15A-15B).

In some aspects, the first group of SSBs and the second group of SSBs are associated with a first SCS, and the group of CORESETs and SIBs is associated with a second SCS. In some aspects, the first SCS is the same as the second SCS. In some aspects, the first SCS is different from the second SCS. The system information module 1008 is further configured to determine a time location for the first CORESET. In some aspects, the determination of the first CORESET location is as discussed herein with reference to FIGS. 7A-7B or FIGS. 14A-14B when the first SCS is 120 kHz and the second SCS is 480 kHz. In other aspects, the determination of the first CORESET location is as discussed herein with reference to FIGS. 8A-8B or FIGS. 15A-15B when the first SCS is 120 kHz and the second SCS is 960 kHz.

The system information 1008 is further configured to transmit SIB scheduling information in a first CORESET within the group of CORESETs and SIBs and transmit a first SIB of the group of CORESETs and SIBs based on the SIB scheduling information.

As shown, the transceiver 1010 may include the modem subsystem 1012 and the RF unit 1014. The transceiver 1010 can be configured to communicate bi-directionally with other devices, such as the UEs 115 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., RRC configuration, SSBs, SIB scheduling information, SIB) from the modem subsystem 1012 (on outbound transmissions) or of transmissions originating from another source such as a UE 115. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 105 to enable the BS 105 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices and provide the received data messages for processing and/or demodulation at the transceiver 1010. The transceiver 1010 may provide the demodulated and decoded data to the system information module 1008 for processing. The antennas 1016 may include multiple antennas of similar or different designs in order to sustain multiple transmission links.

In an aspect, the BS 1000 can include multiple transceivers 1010 implementing different RATs (e.g., NR and LTE). In an aspect, the BS 1000 can include a single transceiver 1010 implementing multiple RATs (e.g., NR and LTE). In an aspect, the transceiver 1010 can include various components, where different combinations of components can implement different RATs.

Figure 11:
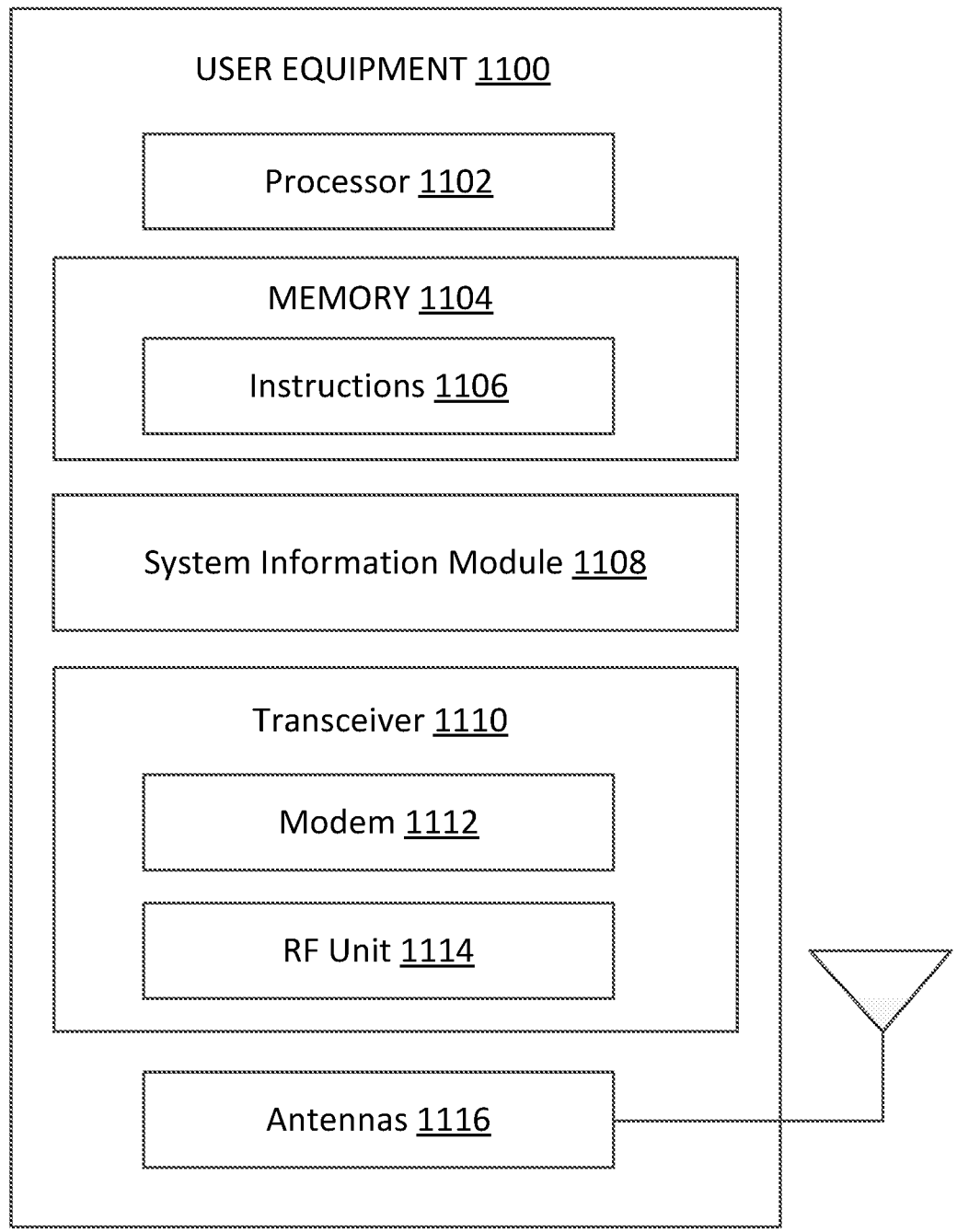
FIG. 11 is a block diagram of an exemplary user equipment (UE) according to some aspects of the present disclosure.

FIG. 11 is a block diagram of an exemplary UE 1100 according to some aspects of the present disclosure. The UE 1100 may be a UE 115 as discussed above with respect to FIG. 1. As shown, the UE 1100 may include a processor 1102, a memory 1104, a system information module 1108, a transceiver 1110 including a modem subsystem 1112 and a radio frequency (RF) unit 1114, and one or more antennas 1116. These elements may be coupled with one another. The term "coupled" may refer to directly or indirectly coupled or connected to one or more intervening elements. For instance, these elements may be in direct or indirect communication with each other, for example via one or more buses.

The processor 1102 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1104 includes a non-transitory computer-readable medium. The memory 1104 may store, or have recorded thereon, instructions 1106. The instructions 1106 may include instructions that, when executed by the processor 1102, cause the processor 1102 to perform the operations described herein with reference to the UEs 115 in connection with aspects of the present disclosure, for example, aspects of FIGS. 1-2 and 6-9, and 12. Instructions 1106 may also be referred to as program code, which may be interpreted broadly to include any type of computer-readable statement(s) as discussed above with respect to FIG. 10.

The system information module 1108 may be implemented via hardware, software, or combinations thereof. For example, the system information module 1108 may be implemented as a processor, circuit, and/or instructions 1106 stored in the memory 1104 and executed by the processor 1102. In some examples, the system information module 1108 can be integrated within the modem subsystem 1112. For example, the system information module 1108 can be implemented by a combination of software components (e.g., executed by a DSP or a general processor) and hardware components (e.g., logic gates and circuitry) within the modem subsystem 1112.

The system information module 1108 may communicate with various components of the UE 1100 to perform aspects of the present disclosure, for example of FIGS. 1-2 and 6-9, and 12. In some aspects, the system information module 1108 is configured to receive, from a BS (e.g., BS 105 or 1000), a first SSB of a first group of SSBs of an SSB burst set. In some instances, the SSB burst set may be associated with a set of predefined beam directions. The first group of SSBs and a second group of SSBs of the SSB burst set are spaced apart in time by resources associated with a group of CORESETs and SIBs. The group of CORESETs and SIBs includes one CORESET and at least one SIB for each SSB of the first group of SSBs.

In some aspects, the group of CORESETs and SIBs are associated with the first group of SSBs and are located in a gap period after the first group of SSBs (e.g., as shown in FIGS. 7A-7B and 8A-8B). In other aspects, the group of CORESETs and SIBs are associated with the first group of SSBs and are located in a gap period before the first group of SSBs (e.g., as shown in FIGS. 14A-14B and 15A-15B).

In some aspects, the first group of SSBs and the second group of SSBs are associated with a first SCS, and the group of CORESETs and SIBs is associated with a second SCS. In some aspects, the first SCS is the same as the second SCS. In some aspects, the first SCS is different from the second SCS. The system information module 1108 is further configured to identify, based on the first SSB, a first CORESET, wherein the first CORESET is within the group of CORESETs and SIBs. In some aspects, the identifying the first CORESET location as discussed herein with reference to FIGS. 7A-7B or FIGS. 14A-14B when the first SCS is 120 kHz and the second SCS is 480 kHz. In other aspects, the identifying the first CORESET location as discussed herein with reference to FIGS. 8A-8B or FIGS. 15A-15B when the first SCS is 120 kHz and the second SCS is 960 kHz.

The system information module 1108 is further configured to monitor for SIB scheduling information in the first CORESET and receive a first SIB of the group of CORESETs and SIBs based on the SIB scheduling information.

As shown, the transceiver 1110 may include the modem subsystem 1112 and the RF unit 1114. The transceiver 1110 can be configured to communicate bi-directionally with other devices, such as the BSs 105. The modem subsystem 1112 may be configured to modulate and/or encode the data from the memory 1104 and/or the system information module 1108 according to a modulation and coding scheme (MCS), e.g., a low-density parity check (LDPC) coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data from the modem subsystem 1112 (on outbound transmissions) or of transmissions originating from another source such as a UE 115 or a BS 105. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the UE 115 to enable the UE 115 to communicate with other devices.

The RF unit 1114 may provide the modulated and/or processed data, e.g. data packets (or, more generally, data messages that may include one or more data packets and other information), to the antennas 1116 for transmission to one or more other devices. The antennas 1116 may further receive data messages transmitted from other devices. The antennas 1116 may provide the received data messages for processing and/or demodulation at the transceiver 1110. The transceiver 1110 may provide the demodulated and decoded data (e.g., RRC configuration, SSBs, SIB scheduling information, SIB) to the system information module 1108 for processing. The antennas 1116 may include multiple antennas of similar or different designs in order to sustain multiple transmission links. The RF unit 1114 may configure the antennas 1116.

In an aspect, the UE 1100 can include multiple transceivers 1110 implementing different RATs (e.g., NR and LTE). In an aspect, the UE 1100 can include a single transceiver 1110 implementing multiple RATs (e.g., NR and LTE). In an aspect, the transceiver 1110 can include various components, where different combinations of components can implement different RATs.

Figure 12:
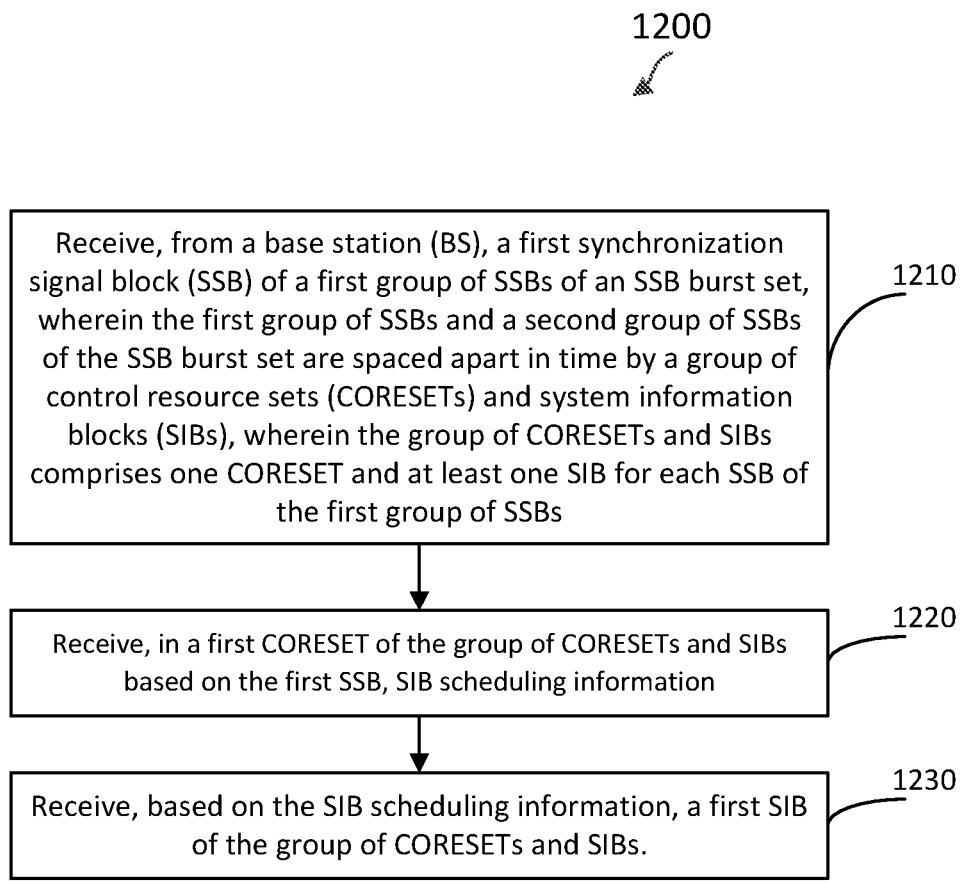
FIG. 12 is a flow diagram of a wireless communication method according to some aspects of the present disclosure.

FIG. 12 is a flow diagram of a wireless communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as the UEs 115 or 1100 may utilize one or more components, such as the processor 1102, the memory 1104, the system information module 1108, the transceiver 1110, the modem 1112, and the one or more antennas 1116, to execute the steps of method 1200. The method 1200 may employ similar mechanisms as described above in FIGS. 6-9. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, a UE (e.g., the UE 115 or 1100) receives, from a BS (e.g., BS 105 or 1000), a first SSB of a first group of SSBs of an SSB burst set. The first group of SSBs and a second group of SSBs of the SSB burst set are spaced apart in time by resources associated with a group of CORESETs and SIBs. The group of CORESETs and SIBs includes one CORESET and at least one SIB for each SSB of the first group of SSBs. In some aspects, the SSB burst set may be associated with a set of predefined beam directions and may span a duration of about 5 ms.

In some aspects, the group of CORESETs and SIBs are associated with the first group of SSBs and are located in a gap period after the first group of SSBs (e.g., as shown in FIGS. 7A-7B and 8A-8B). In other aspects, the group of CORESETs and SIBs are associated with the first group of SSBs and are located in a gap period before the first group of SSBs (e.g., as shown in FIGS. 14A-14B and 15A-15B).

In some aspects, the first group of SSBs and the second group of SSBs are associated with a first SCS, and the group of CORESETs and SIBs is associated with a second SCS. In some aspects, the first SCS is the same as the second SCS. In some aspects, the first SCS is different from the second SCS. In some aspects, the first SCS is 120 kHz and the second SCS is 480 kHz, the group of CORESETs and SIBs is in consecutive slots that are defined based on the second SCS, and each consecutive slot includes two CORESETs of the group of CORESETs and SIBs. In some other aspects, the first SCS is 120 kHz and the second SCS is 960 kHz, the group of CORESETs and SIBs is in consecutive slots that are defined based on the second SCS, and each consecutive slot includes one CORESET of the group of CORESETs and SIBs. In some aspects, the UE may utilize one or more components, such as the processor 1102, the memory 1104, the system information module 1108, the transceiver 1110, the modem 1112, and the one or more antennas 1116 shown in FIG. 11, to perform the operations at block 1210.

At block 1220, the UE receives, in a first CORESET of the group of CORESETs and SIBs based on the first SSB, SIB scheduling information. For instance, the UE may identify the first CORESET based on the first SSB and monitor for SIB scheduling information in the first CORESET. The UE may determine a time location of the first CORESET based on an SSB index indicated by the first SSB, the first SCS, the second SCS, and/or a slot index of the slot where the first SSB is received. In some aspects, the UE determine a slot index $n_c$ for the first CORESET. In some aspects, the first SCS is 120 kHz and the second SCS is 480 kHz, and the UE may determine the slot index $n_c$ in accordance with the equation (2) described above. In some other aspects, the first SCS is 120 kHz and the second SCS is 960 kHz, and the UE may determine the slot index $n_c$ in accordance with the equation (3) described above. In some aspects, the UE may utilize one or more components, such as the processor 1102, the memory 1104, the system information module 1108, the transceiver 1110, the modem 1112, and the one or more antennas 1116 shown in FIG. 11, to perform the operations at block 1220.

At block 1230, the UE receives, based on the SIB scheduling information, a first SIB of the group of CORESETs and SIBs. In some aspects, the first CORESET identified at block 1220 is in a first set of symbols within a first slot, and the first SIB is received in a second set of symbols within the first slot. In some aspects, the UE may utilize one or more components, such as the processor 1102, the memory 1104, the system information module 1108, the transceiver 1110, the modem 1112, and the one or more antennas 1116 shown in FIG. 11, to perform the operations at block 1230.

Figure 13:
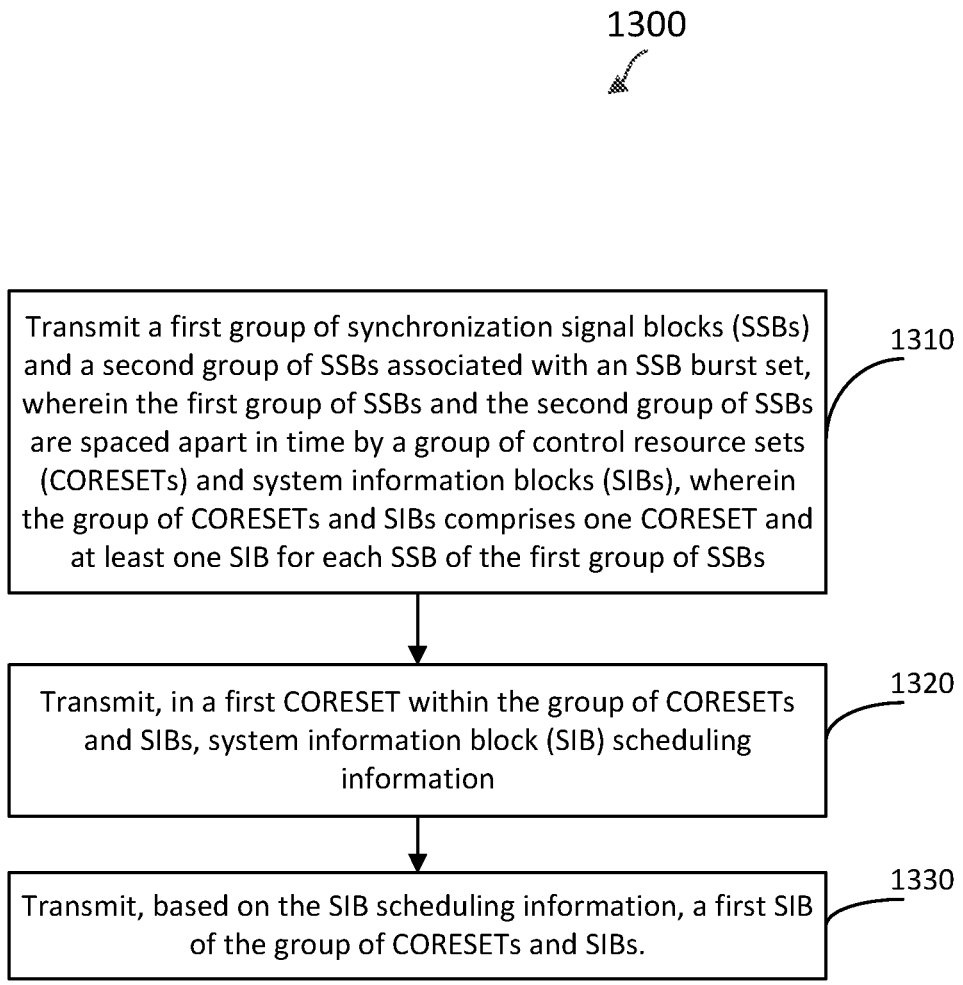
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the BSs 105 or 1000 may utilize one or more components, such as the processor 1002, the memory 1004, the system information module 1008, the transceiver 1010, the modem 1012, and the one or more antennas 1016, to execute the steps of method 1300. The method 1300 may employ similar mechanisms as described above in FIGS. 6-9. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a BS (e.g., BS 105 or 1000) transmits a first group of SSBs and a second group of SSBs of an SSB burst set. The first group of SSBs and the second group of SSBs are spaced apart in time by a group of CORESETs and SIBs. The group of CORESETs and SIBs includes one CORESET and at least one SIB for each SSB of the first group of SSBs. In some aspects, the SSB burst set may be associated with a set of predefined beam directions and may span a duration of about 5 ms.

In some aspects, the group of CORESETs and SIBs are associated with the first group of SSBs and are located in a gap period after the first group of SSBs (e.g., as shown in FIGS. 7A-7B and 8A-8B). In other aspects, the group of CORESETs and SIBs are associated with the first group of SSBs and are located in a gap period before the first group of SSBs (e.g., as shown in FIGS. 14A-14B and 15A-15B).

In some aspects, the first group of SSBs and the second group of SSBs are associated with a first SCS, and the group of CORESETs and SIBs is associated with a second SCS. In some aspects, the first SCS is the same as the second SCS. In some aspects, the first SCS is different from the second SCS. In some aspects, the first SCS is 120 kHz and the second SCS is 480 kHz, the group of CORESETs and SIBs is in consecutive slots that are defined based on the second SCS, and each consecutive slot includes two CORESETs of the group of CORESETs and SIBs. In some other aspects, the first SCS is 120 kHz and the second SCS is 960 kHz, the group of CORESETs and SIBs is in consecutive slots that are defined based on the second SCS, and each consecutive slot includes one CORESET of the group of CORESETs and SIBs. In some aspects, the BS may utilize one or more components, such as the processor 1002, the memory 1004, the system information module 1008, the transceiver 1010, the modem 1012, and the one or more antennas 1016 shown in FIG. 10, to perform the operations at block 1310.

At block 1320, the BS transmits, in a first CORESET within the group of CORESETs and SIBs, SIB scheduling information. In some aspects, the BS may utilize one or more components, such as the processor 1002, the memory 1004, the system information module 1008, the transceiver 1010, the modem 1012, and the one or more antennas 1016 shown in FIG. 10, to perform the operations at block 1320.

At block 1330, the BS transmits, based on the SIB scheduling information, a first SIB of the group of CORESETs and SIBs. In some aspects, the BS may utilize one or more components, such as the processor 1002, the memory 1004, the system information module 1008, the transceiver 1010, the modem 1012, and the one or more antennas 1016 shown in FIG. 10, to perform the operations at block 1330.

In some aspects, the BS further determines a slot index $n_c$ for the first CORESET. In some aspects, the first SCS is 120 kHz and the second SCS is 480 kHz, and the BS may determine the slot index $n_c$ in accordance with the equation (2) described above with reference to FIGS. 7A-7B. In some other aspects, the first SCS is 120 kHz and the second SCS is 960 kHz, and the BS may determine the slot index $n_c$ in accordance with the equation (3) described above with reference to FIG. 8A-8B. In some aspects, the first CORESET is in a first set of symbols within a first slot, and the first SIB is transmitted in a second set of symbols within the first slot.

Figure 14A:
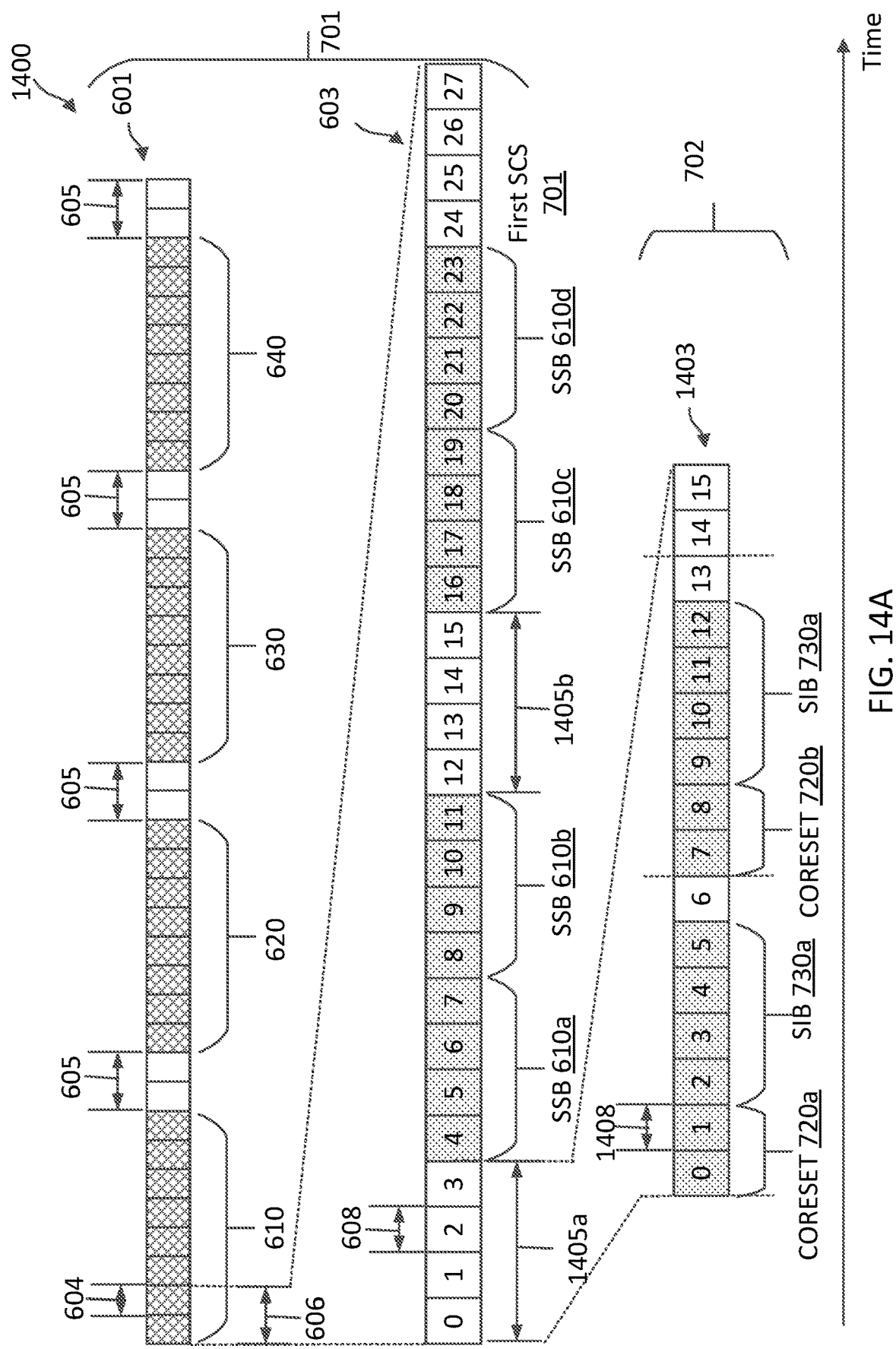
FIG. 14A illustrates a system information multiplexing scheme according to some aspects of the present disclosure.
Figure 14B:
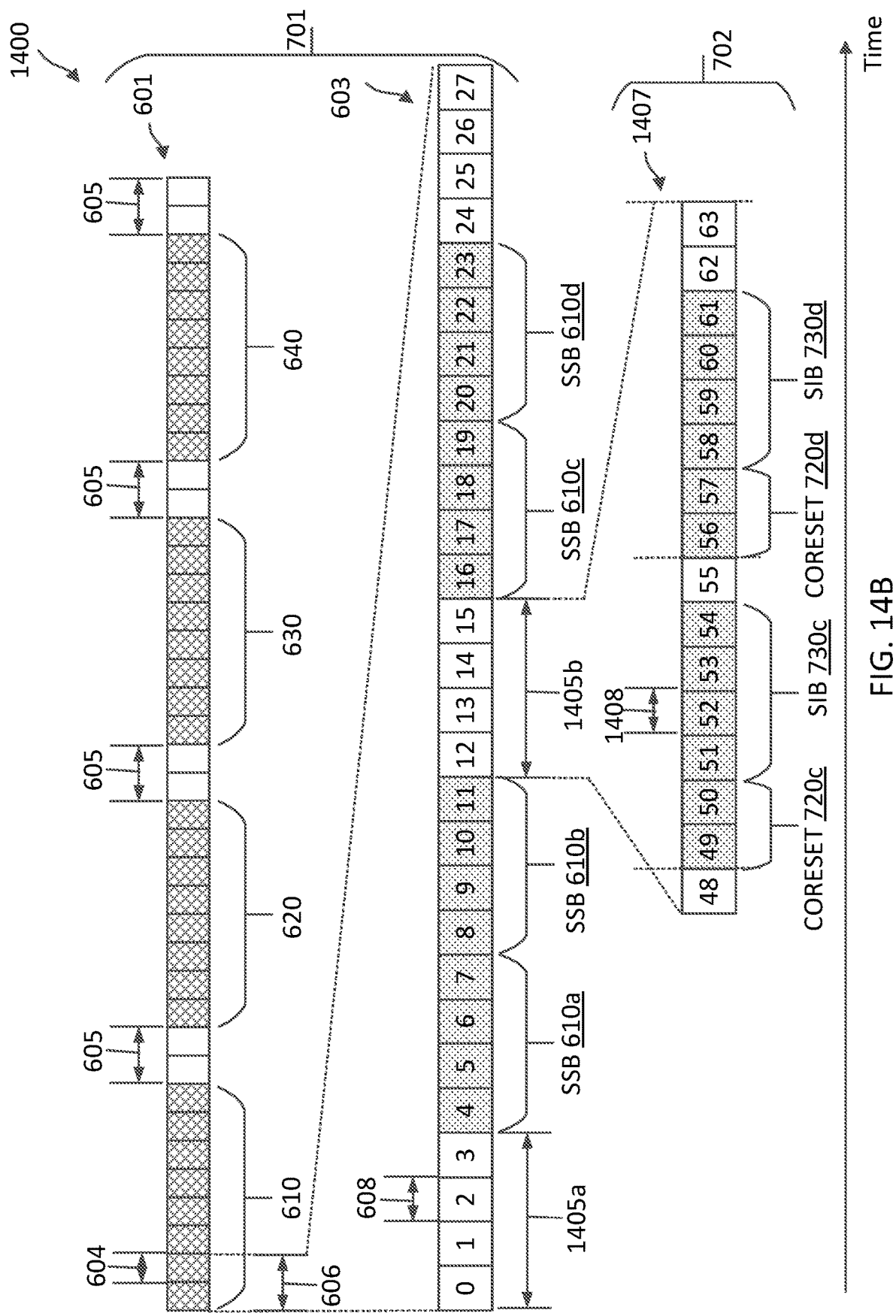
FIG. 14B illustrates a system information multiplexing scheme according to some aspects of the present disclosure.

FIG. 14A-14B illustrates a system information multiplexing scheme 1400 according to some aspects of the present disclosure. The scheme 1400 may be employed by BSs such as the BSs 105 and UEs such as the UEs 115 in a network such as the network 100 for communications. In particular, the BS 105 may multiplex SSBs (e.g., the SSBs 310) transmitted based on a first SCS 701 (e.g., 120 kHz) with CORESET 0 (e.g., the CORESET 320) and SIBs (e.g., the RMSI 332) configured or scheduled based on a second SCS 702 (e.g., 480 kHz) as shown in the scheme 1400. In FIG. 14A and 14B, the x-axes represent time in some arbitrary units. The scheme 1400 is described using the same SSB transmission structure as in the scheme 600 and the same SCS configuration as in the schemes 700A-700B, and may use the same reference numerals as in FIGS. 6 and 7A-7B for simplicity's sake.

As described above, the BS 105 may time-multiplex SSBs and associated CORESETs (CORESET 0) in units of SSB groups and CORESET/SIB groups. In contrast to the schemes 700A and 700B, the BS 105 configures and/or schedules a group of CORESETs and SIBs for a group of SSBs within the same set of consecutive slots where the group of SSBs is transmitted (using gap period or gap symbols within the set of consecutive slots).

FIG. 14A and 14B illustrate the same expanded views 601 and 603 of FIG. 6. As can be seen in the expanded view 603, symbols 608 indexed 0-3 before the SSBs 610a and 610b are unoccupied (a gap period 1405 shown by the empty-filled boxes). Similarly, symbols 608 indexed 12-15 before the SSBs 610c and 610d are unoccupied (a gap period 1405 shown the empty-filled boxes). In the scheme 1400, the BS 105 may configure and/or schedule a group of CORESETs/SIBs for every sub-group of two SSBs in a gap period 1405 (shown as 1405a and 1405b) before the sub-group of two SSBs. For instance, the BS 105 may configure and/or schedule a group of CORESETs/SIBs for the two SSBs 610a and 610b in the symbols 608 indexed 0-3, and may configure and/or schedule a group of CORESETs/SIBs for the two SSBs 610c and 610d in the symbols 608 indexed 12-15.

A gap period 1405 including four symbols 608 at the first SCS 701 of 120 kHz may include sixteen symbols 1408 at the second SCS 702 of 480 kHz. Referring to FIG. 14A, in the expanded view 1403, the symbols 1408 in the gap period 1405a are indexed from 0 to 15, and the vertical dashed lines at the start of symbols 1408 indexed 0, 7, and 14 are slot/min-slot boundaries. The BS 105 may configure a CORESET 720a for the SSB 610a in the symbols 1408 indexed 0-1 and may configure a CORESET 720b for the SSB 610b in the symbols 1408 indexed 7-8. The CORESET 720a and the CORESET 720b are aligned to slot/mini-slot boundaries. The BS 105 may configure a PDSCH (e.g., the PDSCH 330) for SIB transmission (e.g., the RMSI 332) in symbols 1408 adjacent to and following a corresponding CORESET 720. In this regard, the BS 105 may transmit SIB scheduling information associated with the SSB 610a in the CORESET 720a, where the SIB scheduling information may schedule a SIB 730a in a PDSCH located at symbols 1408 indexed 2-5 subsequent to the CORESET 720a. The SIB 730a may occupy one or more of the symbols 1408 indexed 2-5. Similarly, the BS 105 may transmit SIB scheduling information associated with the SSB 610b in the CORESET 720b, where the SIB scheduling information may schedule a SIB 730b in a PDSCH located at symbols 1408 indexed 9-12 subsequent to the CORESET 720b. The SIB 730b may occupy one or more of the symbols 1408 indexed 9-12.

Referring to FIG. 14B, in the expanded view 1407, the symbols 1408 in the gap period 1405b are indexed from 48 to 63, and the vertical dashed lines at the start of symbols 1408 indexed 49, 56, and 63 are slot/min-slot boundaries. The BS 105 may configure a CORESET 720c for the SSB 610c in the symbols 1408 indexed 49-50 and may configure a CORESET 720d for the SSB 610d in the symbols 1408 indexed 56-57. The CORESET 720c and the CORESET 720d are aligned to slot/mini-slot boundaries. The BS 105 may configure a PDSCH (e.g., the PDSCH 330) for SIB transmission (e.g., the RMSI 332) in symbols 1408 adjacent to and following a corresponding CORESET 720. In this regard, the BS 105 may transmit SIB scheduling information associated with the SSB 610c in the CORESET 720c, where the SIB scheduling information may schedule a SIB 730c in a PDSCH located at symbols 1408 indexed 51-54 subsequent to the CORESET 720c. The SIB 730c may occupy one or more of the symbols 1408 indexed 51-54. Similarly, the BS 105 may transmit SIB scheduling information associated with the SSB 610d in the CORESET 720d, where the SIB scheduling information may schedule a SIB 730d in a PDSCH located at symbols 1408 indexed 58-61 subsequent to the CORESET 720d. The SIB 730d may occupy one or more of the symbols 1408 indexed 58-61.

The BS 105 may configure CORESETs and transmit SIBs for each remaining SSB in the group of SSBs 610, 620, 630, 640 in a similar manner as shown by the expanded view 1403 of FIG. 14A and/or the expanded view 1407 of FIG. 14B. In general, the slot time location of an SSB and the time location of a corresponding CORESET may have a relationship as shown below:

$$SFN_c = SFN_{SSB}, n_c = 40 \times k + \{0, 0, 3, 4\}, \tag{4}$$

and the starting symbols index for the CORESET are {0, 7, 7, 0} for i=4×k+{0, 1, 2, 3}, and i represents the SSB index and slot index $n_c$ is based on the second SCS.

Figure 15A:
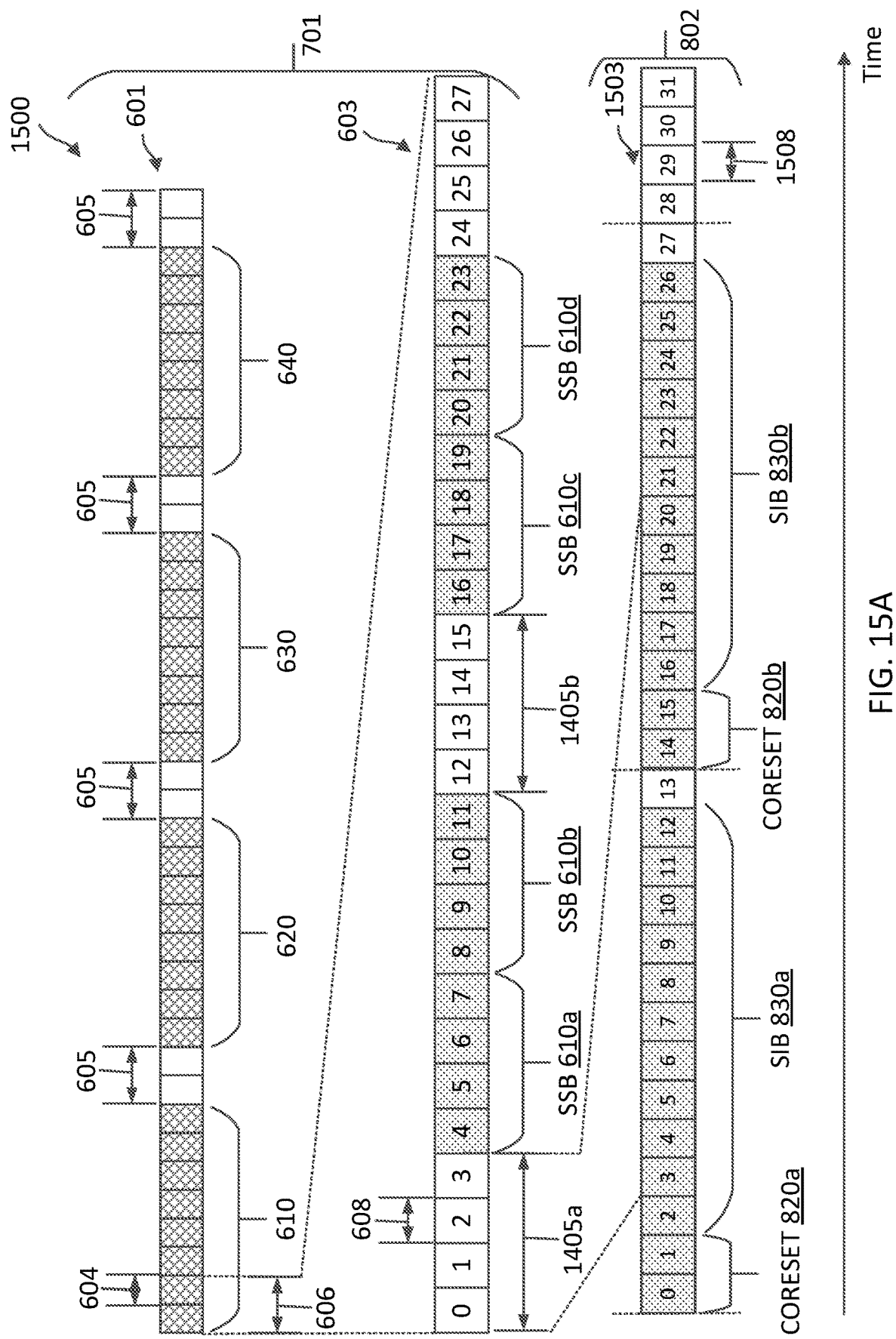
FIG. 15A illustrates a system information multiplexing scheme according to some aspects of the present disclosure.
Figure 15B:
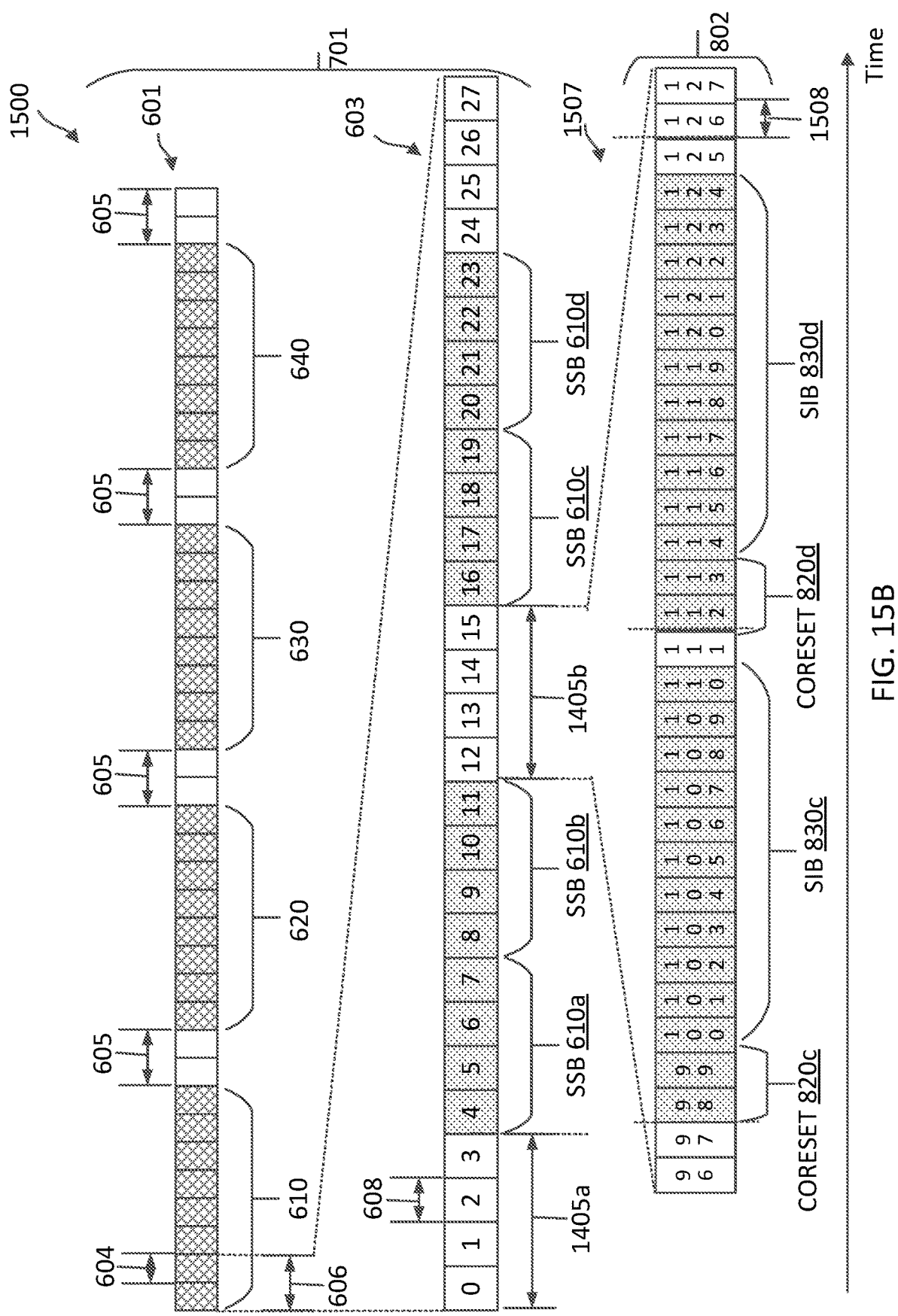
FIG. 15B illustrates a system information multiplexing scheme according to some aspects of the present disclosure.

FIG. 15A-15B illustrates a system information multiplexing scheme 1500 according to some aspects of the present disclosure. The scheme 1500 may be employed by BSs such as the BSs 105 and UEs such as the UEs 115 in a network such as the network 100 for communications. In particular, the BS 105 may multiplex SSBs (e.g., the SSBs 310) transmitted based on a first SCS 701 (e.g., 120 kHz) with CORESET 0 (e.g., the CORESET 320) and SIBs (e.g., the RMSI 332) configured or scheduled based on a second SCS 802 (e.g., 960 kHz) as shown in the scheme 1500. In FIG. 15A and 15B, the x-axes represent time in some arbitrary units. The scheme 1500 is described using the same SSB transmission structure as in the scheme 600 and the same SCS configuration as in the scheme 800A-800B, and may use the same reference numerals as in FIGS. 6 and 8A-8B for simplicity's sake.

As described above, the BS 105 may time-multiplex SSBs and associated CORESETs (CORESET 0) in units of SSB groups and CORESET/SIB groups. In contrast to the schemes 800A and 800B, the BS 105 configures and/or schedules a group of CORESETs and SIBs for a group of SSBs within the same set of consecutive slots where the group of SSBs is transmitted (using gap period or gap symbols within the set of consecutive slots).

FIG. 15A and 15B illustrate the same expanded views 601 and 603 of FIG. 6. As can be seen in the expanded view 603, symbols 608 indexed 0-3 before the SSBs 610a and 610b are unoccupied (a gap period 1405 shown by the empty-filled boxes). Similarly, symbols 608 indexed 12-15 before the SSBs 610c and 610d are unoccupied (a gap period 1405 shown the empty-filled boxes). In the scheme 1500, the BS 105 may configure and/or schedule a group of CORESETs/SIBs for every sub-group of two SSBs in a gap period 1405 (shown as 1405a and 1405b) before the sub-group of two SSBs. For instance, the BS 105 may configure and/or schedule a group of CORESETs/SIBs for the two SSBs 610a and 610b in the symbols 608 indexed 0-3, and may configure and/or schedule a group of CORESETs/SIBs for the two SSBs 610c and 610d in the symbols 608 indexed 12-15.

A gap period 1405 including four symbols 608 at the first SCS 701 of 120 kHz may include thirty-two symbols 1408 at the second SCS 802 of 960 kHz. Referring to FIG. 15A, in the expanded view 1503, the symbols 1508 in the gap period 1405a are indexed from 0 to 31, and the vertical dashed lines at the start of symbols 1508 indexed 0, 14, and 28 are slot boundaries. The BS 105 may configure a CORESET 820a for the SSB 610a in the symbols 1508 indexed 0-1 and may configure a CORESET 820b for the SSB 610b in the symbols 1408 indexed 14-15. The CORESET 820a and the CORESET 820b are aligned to the mini-slot boundaries. The BS 105 may configure a PDSCH (e.g., the PDSCH 330) for SIB transmission (e.g., the RMSI 332) in symbols 1508 adjacent to and following a corresponding CORESET 820. In this regard, the BS 105 may transmit SIB scheduling information associated with the SSB 610a in the CORESET 820a, where the SIB scheduling information may schedule a SIB 830a in a PDSCH located at symbols 1508 indexed 2-12 subsequent to the CORESET 820a. The SIB 830a may occupy one or more of the symbols 1508 indexed 2-12. Similarly, the BS 105 may transmit SIB scheduling information associated with the SSB 610b in the CORESET 820b, where the SIB scheduling information may schedule a SIB 830b in a PDSCH located at symbols 1508 indexed 16-26 subsequent to the CORESET 820b. The SIB 830b may occupy one or more of the symbols 1408 indexed 16-26.

Referring to FIG. 15B, in the expanded view 1507, the symbols 1508 in the gap period 1405b are indexed from 96 to 127, and the vertical dashed lines at the start of symbols 1508 indexed 98, 112, and 126 are slot boundaries. The BS 105 may configure a CORESET 820c for the SSB 610c in the symbols 1508 indexed 98-99 and may configure a CORESET 820d for the SSB 610d in the symbols 1508 indexed 112-113. The CORESET 820c and the CORESET 820d are aligned to slot boundaries. The BS 105 may configure a PDSCH (e.g., the PDSCH 330) for SIB transmission (e.g., the RMSI 332) in symbols 1508 adjacent to and following a corresponding CORESET 820. In this regard, the BS 105 may transmit SIB scheduling information associated with the SSB 610c in the CORESET 820c, where the SIB scheduling information may schedule a SIB 830c in a PDSCH located at symbols 1508 indexed 100-110 subsequent to the CORESET 820c. The SIB 830c may occupy one or more of the symbols 1508 indexed 100-110. Similarly, the BS 105 may transmit SIB scheduling information associated with the SSB 610d in the CORESET 820d, where the SIB scheduling information may schedule a SIB 830d in a PDSCH located at symbols 1508 indexed 114-124 subsequent to the CORESET 820d. The SIB 830d may occupy one or more of the symbols 1508 indexed 114-124.

The BS 105 may configure CORESETs and transmit SIBs for each remaining SSB in the group of SSBs 610, 620, 630, 640 in a similar manner as shown by the expanded view 1503 of FIG. 15A and/or the expanded view 1507 of FIG. 15B. In general, the slot time location of an SSB and the time location of a corresponding CORESET may have a relationship as shown below:

$$SFN_c = SFN_{SSB}, n_c = 80 \times k + \{0, 1, 7, 8\}, \tag{5}$$

and the starting symbols index for the CORESET are {0, 0, 0, 0} for i=4×k+{0, 1, 2, 3}, and i represents the SSB index and slot index $n_c$ is based on the second SCS.

Further aspects of the present disclosure include the followings:
1. A method of wireless communication performed by a user equipment (UE), the method comprising:
   receiving, from a base station (BS), a first synchronization signal block (SSB) of a first group of SSBs of an SSB burst set, wherein the first group of SSBs and a second group of SSBs of the SSB burst set are spaced apart in time by a group of control resource sets (CORESETs) and system information blocks (SIBs), wherein the group of CORESETs and SIBs comprises one CORESET and at least one SIB for each SSB of the first group of SSBs;

receiving, in a first CORESET of the group of CORESETs and SIBs based on the first SSB, SIB scheduling information; and receiving, based on the SIB scheduling information, a first SIB of the group of CORESETs and SIBs.

2. The method of aspect 1, wherein the first group of SSBs and the second group of SSBs are associated with a first subcarrier spacing (SCS), and wherein the group of CORESETs and SIBs is associated with a second SCS different from the first SCS.

3. The method of any of aspects 1-2, wherein the group of CORESETs and SIBs is in consecutive slots, wherein the consecutive slots are based on the second SCS, and wherein each consecutive slot includes two CORESETs of the group of CORESETs and SIBS.

4. The method of any of aspects 1-3, wherein the first SCS is 120 kilohertz (kHz), and wherein the second SCS is 480 kHz.

5. The method of any of aspects 1-4, further comprising: determining a slot index $n_c$ for the first CORESET, based on the second SCS, in accordance with the following:

$$n_c = 32 + \text{floor}((i \bmod 16)/2) + \text{floor}(n_i/40) \times 40,$$

wherein i is an SSB index associated with the first SSB and $n_i$ is a slot index associated with the first SSB.

6. The method of any of aspects 1-2, wherein the group of CORESETs and SIBs is in consecutive slots, wherein the consecutive slots are based on the second SCS, and wherein each consecutive slot includes one CORESET of the group of CORESETs and SIBS.

7. The method of any of aspects 1-2 or 6, wherein the first SCS is 120 kilohertz (kHz), and wherein the second SCS is 960 kHz.

8. The method of any of aspects 1-2 or 6-7, further comprising:

determining a slot index $n_c$ for the first CORESET, based on the second SCS, in accordance with the following:

$$n_c = 64 + (i \bmod 16) + \text{floor}(n_i/80) \times 80$$

wherein i is an SSB index associated with the first SSB and $n_i$ is a slot index associated with the first SSB.

9. The method of any of aspects 1-8, wherein:
the first CORESET is in a first set of symbols within a first slot, and
the receiving the first SIB comprises:
receiving, during a second set of symbols within the first slot, the first SIB.

10. A method of wireless communication performed by base station (BS), the method comprising:
transmitting a first group of synchronization signal blocks (SSBs) and a second group of SSBs associated with an SSB burst set, wherein the first group of SSBs and the second group of SSBs are spaced apart in time by a group of control resource sets (CORESETs) and system information blocks (SIBs), wherein the group of CORESETs and SIBs comprises one CORESET and at least one SIB for each SSB of the first group of SSBs;
transmitting, in a first CORESET within the group of CORESETs and SIBs, SIB scheduling information; and
transmitting, based on the SIB scheduling information, a first SIB of the group of CORESETs and SIBs.

11. The method of aspect 10, wherein the first group of SSBs and the second group of SSBs are associated with a first subcarrier spacing (SCS), and wherein the group of CORESETs and SIBs is associated with a second SCS different from the first SCS.

12. The method of any of aspects 10-11, wherein the group of CORESETs and SIBs is in consecutive slots, wherein the consecutive slots are based on the second SCS, and wherein each consecutive slot includes two CORESETs and two SIBs of the group of CORESETs and SIBs.

13. The method of any of aspects 10-12, wherein the first SCS is 120 kilohertz (kHz), and wherein the second SCS is 480 kHz.

14. The method of any of aspects 10-13, further comprising:
determining a slot index $n_c$ for the first CORESET, based on the second SCS, in accordance with the following:

$$n_c = 32 + \text{floor}((i \bmod 16)/2) + \text{floor}(n_i/40) \times 40,$$

wherein i is an SSB index associated with the first SSB and $n_i$ is a slot index associated with the first SSB.

15. The method any of aspects 10-11, wherein the group of CORESETs and SIBs is in consecutive slots, wherein the consecutive slots are based on the second SCS, and wherein each consecutive slot includes one CORESET and one SIB of the group of CORESETs and SIBs.

16. The method any of aspects 10-11 or 15, wherein the first SCS is 120 kilohertz (kHz), and wherein the second SCS is 960 kHz.

17. The method of any of aspects 10-11 or 15-16, further comprising:
determining a slot index $n_c$ for the first CORESET, based on the second SCS, in accordance with the following:

$$n_c = 64 + (i \bmod 16) + \text{floor}(n_i/80) \times 80$$

wherein i is an SSB index associated with the first SSB and $n_i$ is a slot index associated with the first SSB.

18. The method of any of aspects 10-17, wherein:
the first CORESET is in a first set of symbols within a first slot, and
the transmitting the first SIB comprises:
transmitting, during a second set of symbols within the first slot, the first SIB.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a base station (BS), a first synchronization signal block (SSB) of a first group of SSBs of an SSB burst set, wherein the first group of SSBs and a second group of SSBs of the SSB burst set are spaced apart in time by a group of control resource sets (CORESETs) and system information blocks (SIBs), wherein the group of CORESETs and SIBs comprises one CORESET and at least one SIB for each SSB of the first group of SSBs;
   receiving, in a first CORESET of the group of CORESETs and SIBs based on the first SSB, SIB scheduling information;
   receiving, based on the SIB scheduling information, a first SIB of the group of CORESETs and SIBs;
   wherein the first group of SSBs and the second group of SSBs are associated with a first subcarrier spacing (SCS), and wherein the group of CORESETs and SIBs is associated with a second SCS different from the first SCS;
   wherein the group of CORESETs and SIBs is in consecutive slots, wherein the consecutive slots are based on the second SCS, and wherein each consecutive slot includes two CORESETs and two SIBs of the group of CORESETs and SIBs;
   wherein the first SCS is 120 kilohertz (kHz), and wherein the second SCS is 480 kHz;
   determining a slot index $n_c$ for the first CORESET based on the second SCS in accordance with the following:

$$n_c = 32 + \text{floor}((i \bmod 16)/2) + \text{floor}(n_i/40) \times 40;$$

and
   wherein i is an SSB index associated with the first SSB and $n_i$ is a slot index associated with the first SSB based on the second SCS.

2. The method of claim 1, wherein:
   the first CORESET is in a first set of symbols within a first slot, and
   the receiving the first SIB comprises:
      receiving, during a second set of symbols within the first slot, the first SIB.

3. A method of wireless communication performed by base station (BS), the method comprising:
   transmitting a first group of synchronization signal blocks (SSBs) and a second group of SSBs associated with an SSB burst set, wherein the first group of SSBs and the second group of SSBs are spaced apart in time by a group of control resource sets (CORESETs) and system information blocks (SIBs), wherein the group of CORESETs and SIBs comprises one CORESET and at least one SIB for each SSB of the first group of SSBs;
   transmitting, in a first CORESET within the group of CORESETs and SIBs, SIB scheduling information;
   transmitting, based on the SIB scheduling information, a first SIB of the group of CORESETs and SIBs;
   wherein the first group of SSBs and the second group of SSBs are associated with a first subcarrier spacing (SCS), and wherein the group of CORESETs and SIBs is associated with a second SCS different from the first SCS;
   wherein the group of CORESETs and SIBs is in consecutive slots, wherein the consecutive slots are based on the second SCS, and wherein each consecutive slot includes two CORESETs and two SIBs of the group of CORESETs and SIBs;
   wherein the first SCS is 120 kilohertz (kHz), and wherein the second SCS is 480 kHz;
   determining a slot index $n_c$ for the first CORESET based on the second SCS in accordance with the following:

$$n_c = 32 + \text{floor}((i \bmod 16)/2) + \text{floor}(n_i/40) \times 40;$$

and
   wherein i is an SSB index associated with the first SSB and $n_i$ is a slot index associated with the first SSB based on the second SCS.

4. A user equipment (UE) comprising:
   a processor; and
   a transceiver coupled to the processor, wherein the transceiver is configured to:
      receive, from a base station (BS), a first synchronization signal block (SSB) of a first group of SSBs of an SSB burst set, wherein the first group of SSBs and a second group of SSBs of the SSB burst set are spaced apart in time by a group of control resource sets (CORESETs) and system information blocks (SIBs), wherein the group of CORESETs and SIBs comprises one CORESET and at least one SIB for each SSB of the first group of SSBs;
      receive, in a first CORESET of the group of CORESETs and SIBs based on the first SSB, SIB scheduling information;

receive, based on the SIB scheduling information, a first SIB of the group of CORESETs and SIBs;

wherein the first group of SSBs and the second group of SSBs are associated with a first subcarrier spacing (SCS), and wherein the group of CORESETs and SIBs is associated with a second SCS different from the first SCS;

wherein the group of CORESETs and SIBs is in consecutive slots, wherein the consecutive slots are based on the second SCS, and wherein each consecutive slot includes two CORESETs and two SIBs of the group of CORESETs and SIBs;

wherein the first SCS is 120 kilohertz (kHz), and wherein the second SCS is 480 kHz;

determine a slot index $n_c$ for the first CORESET based on the second SCS in accordance with the following:

$$n_c = 32 + \text{floor}((i \bmod 16)/2) + \text{floor}(n_i/40) \times 40;$$

and wherein i is an SSB index associated with the first SSB and $n_i$ is a slot index associated with the first SSB based on the second SCS.

5. The UE of claim 4, wherein:

the first CORESET is in a first set of symbols within a first slot, and the transceiver configured to receive the first SIB is configured to:

receive, during a second set of symbols within the first slot, the first SIB.

6. A base station (BS) comprising:

a processor; and a transceiver coupled to the processor, wherein the transceiver is configured to:

transmit a first group of synchronization signal blocks (SSBs) and a second group of SSBs associated with an SSB burst set, wherein the first group of SSBs and the second group of SSBs are spaced apart in time by a group of control resource sets (CORESETs) and system information blocks (SIBs), wherein the group of CORESETs and SIBs comprises one CORESET and at least one SIB for each SSB of the first group of SSBs;

transmit, in a first CORESET within the group of CORESETs and SIBs, SIB scheduling information;

transmit, based on the SIB scheduling information, a first SIB of the group of CORESETs and SIBs;

wherein the first group of SSBs and the second group of SSBs are associated with a first subcarrier spacing (SCS), and wherein the group of CORESETs and SIBs is associated with a second SCS different from the first SCS;

wherein the group of CORESETs and SIBs is in consecutive slots, wherein the consecutive slots are based on the second SCS, and wherein each consecutive slot includes two CORESETs and two SIBs of the group of CORESETs and SIBs;

wherein the first SCS is 120 kilohertz (kHz), and wherein the second SCS is 480 kHz.

determine a slot index $n_c$ for the first CORESET based on the second SCS in accordance with the following:

$$n_c = 32 + \text{floor}((i \bmod 16)/2) + \text{floor}(n_i/40) \times 40;$$

and wherein i is an SSB index associated with the first SSB and $n_i$ is a slot index associated with the first SSB based on the second SCS.

* * * * *